United States Patent
Radermacher et al.

(10) Patent No.: US 10,018,385 B2
(45) Date of Patent: Jul. 10, 2018

(54) SOLID-STATE HEATING OR COOLING SYSTEMS, DEVICES, AND METHODS

(71) Applicant: University of Maryland, College Park, College Park, MD (US)

(72) Inventors: Reinhard K. Radermacher, Silver Spring, MD (US); Ichiro Takeuchi, Laurel, MD (US); Yunho Hwang, Ellicott City, MD (US); Yiming Wu, Danbury, CT (US); Suxin Qian, Hyattsville, MD (US); Jiazhen Ling, Ellicott City, MD (US)

(73) Assignee: University of Maryland, College Park, College Park, MD (US)

( * ) Notice: Subject to any disclaimer, the term of this patent is extended or adjusted under 35 U.S.C. 154(b) by 350 days.

(21) Appl. No.: 14/860,338

(22) Filed: Sep. 21, 2015

(65) Prior Publication Data
US 2016/0084544 A1    Mar. 24, 2016

Related U.S. Application Data

(60) Provisional application No. 62/052,843, filed on Sep. 19, 2014.

(51) Int. Cl.
*F28D 17/00* (2006.01)
*F25B 23/00* (2006.01)
(Continued)

(52) U.S. Cl.
CPC ............... *F25B 23/00* (2013.01); *C09K 5/10* (2013.01); *C09K 5/14* (2013.01); *Y02P 20/124* (2015.11)

(58) Field of Classification Search
CPC .. F25B 23/00; C09K 5/10; C09K 5/08; C09K 5/14; Y02P 20/124
(Continued)

(56) References Cited

U.S. PATENT DOCUMENTS 3,036,444 A    5/1962    Cochran
3,430,441 A    3/1969    Adams
(Continued)

FOREIGN PATENT DOCUMENTS

CN    1193718 A    9/1998
CN    1641294 A    7/2005
(Continued)

OTHER PUBLICATIONS

Annaorazov et al., "Heat pump cycles based on the AF-F transition in Fe—Rh alloys induced by tensile stress," *International Journal of Refrigeration*, 2002, 25: pp. 1034-1042.
(Continued)

*Primary Examiner* — Claire Rojohn, III
(74) *Attorney, Agent, or Firm* — Shapiro, Gabor and Rosenberger, PLLC

(57) ABSTRACT

A system for heating/cooling includes a plurality of thermoelastic modules. Each of the modules includes one or more structures formed of shape memory alloy, which converts from austenite to martensite upon application of a first stress and release latent heat from the conversion. During a first part of a heating/cooling cycle, a first module is stressed to cause conversion. The latent heat released from the first module is rejected to a heat sink while a second unstressed module absorbs heat from a heat source. During a second part of the heating/cooling cycle, the first and second modules are connected together to transfer heat therebetween for heat recovery. The cycle can be repeated indefinitely with the first and second modules alternating roles. Structures of the thermoelastic cooling material and specific applications thereof are also disclosed.

20 Claims, 10 Drawing Sheets

(51) Int. Cl.
*C09K 5/14* (2006.01)
*C09K 5/10* (2006.01)

(58) Field of Classification Search
USPC .......................................................... 165/10
See application file for complete search history.

(56) References Cited

U.S. PATENT DOCUMENTS

| | | | |
|---|---|---|---|
| 3,599,443 A | 8/1971 | Paine et al. | |
| 3,883,459 A | 5/1975 | Kent | |
| 3,913,326 A | 10/1975 | Banks | |
| 4,027,479 A | 6/1977 | Cory | |
| 4,759,187 A | 7/1988 | O'Hare | |
| 4,922,718 A | 5/1990 | Hochstein et al. | |
| 5,339,653 A | 8/1994 | DeGregoria | |
| 5,465,781 A | 11/1995 | DeGregoria | |
| 5,727,616 A | 3/1998 | Groenke | |
| 6,129,181 A | 10/2000 | Weems | |
| 6,332,323 B1 | 12/2001 | Reid et al. | |
| 6,367,281 B1 | 4/2002 | Hugenroth | |
| 6,458,319 B1* | 10/2002 | Caillat ................ | C22C 1/0491 374/E7.009 |
| 6,574,958 B1 | 6/2003 | MacGregor | |
| 7,629,531 B2* | 12/2009 | Stark .................... | H01L 35/34 136/205 |
| 8,455,751 B2* | 6/2013 | Olsen .................... | H01L 35/16 136/225 |
| 2004/0191556 A1 | 9/2004 | Jardine | |
| 2004/0241004 A1* | 12/2004 | Goodson ............... | F04B 17/00 417/48 |
| 2005/0074647 A1 | 4/2005 | Arthur | |
| 2010/0236236 A1 | 9/2010 | Mankame et al. | |
| 2010/0258265 A1* | 10/2010 | Karanikas ............ | E21B 43/243 165/45 |
| 2011/0030337 A1 | 2/2011 | Mons | |
| 2011/0121582 A1 | 5/2011 | Alexander et al. | |
| 2012/0273158 A1* | 11/2012 | Cui ....................... | C09K 5/14 165/10 |
| 2014/0334106 A1* | 11/2014 | Prest .................... | C22C 45/00 361/718 |
| 2016/0369400 A1* | 12/2016 | Maxwell ............... | C04B 35/58 |
| 2017/0082326 A1* | 3/2017 | Fisher .................. | F25B 23/006 |

FOREIGN PATENT DOCUMENTS

| | | |
|---|---|---|
| CN | 102007363 A | 4/2011 |
| EP | 1555494 A2 | 7/2005 |
| JP | S57-192761 A | 11/1982 |
| JP | 4318567 B2 | 8/2009 |
| WO | WO 2001/035033 A1 | 5/2001 |
| WO | WO 2002/084185 A1 | 10/2002 |

OTHER PUBLICATIONS

Annaorazov et al., "Magnetocaloric heat-pump cycles based on the AF-F transition in Fe—Rh alloys," *Journal of Magnetism and Magnetic Materials*, 2002, 251: pp. 61-73.
Backhaus et al., "A thermoacoustic Stirling heat engine," *Nature*, May 1999, 399: pp. 335-338.
Bejan, A. *Advanced engineering thermodynamics*, Second Edition, 1997, John Wiley & Sons, Inc., New York, Ny, pp. 203-211.
Bonnot et al., "Elastocaloric effect associated with the martensitic transition in shape-memory alloys," *Physical Review Letters*, 2008, 100(12): 125901, arXiv:0802.2009 [cond-mat.mtrl-sci] [online].
Brown, "Magnetic heat pumping near room temperature," *Journal Applied Physics*, Aug. 1976, 47(8): pp. 3673-3680.
Cui et al., "Combinatorial search of thermoelastic shape-memory alloys with extremely small hysteresis width," *Nature Materials*, Apr. 2006, 5: pp. 286-290.
Cui et al., "Demonstration of high efficiency elastocaloric cooling with large delta-T using NiTi wires," *Appl. Phys. Lett.*, 2012, 101: 073904(4).
Farris, R.J., "Rubber heat engines, Analyses and Theory," *Polymer Engineering and Science*, Oct. 1977, 17(10): pp. 737-744.
Garrett, S.L., "Resource letter: TA-1: Thermoacoustic engines and refrigerators," *Am. J. Phys.*, Jan. 2004, 72(1): pp. 11-17.
Gscneidner, Jr. et al., "Magnetic cooling for appliances," *Proceedings of the 50$^{th}$ Annual International Conference on Appliance Technology*, 1999, pp. 144-150.
Gscneidner, Jr. et al., "Magnetocaloric materials," *Annu. Rev. Mater. Sci.*, 2000, 30: pp. 387-429.
Hall et al., "Analyzing magnetic refrigeration efficiency: a rotary AMR-Reverse Brayton case study," *Advances in Cryogenic Engineering*, 1998, 43: pp. 1719-1728.
Ho et al., "Stress induced phase changing material for thermoacoustic refrigeration," *Integrated Ferroelectrics*, 2008, 101: pp. 89-100.
Kauffman et al., "The story of nitinol: The serendipitous discovery of the memory metal and its applications," *The Chemical Educator*, 1996, 2(2): pp. 1-21.
Kim et al., "Solar refrigeration options—a state of the art review," *International Journal of Refrigeration*, 2008, 31: pp. 3-15.
Leo et al., "Transient heat transfer effects on the psuedoelastic behavior of shape-memory wires," *Acta metall. mater*, 1993, 41(8): pp. 2477-2485.
Lyon et al., "Polyurethane-urea elastomers as working substances in rubber heat engines," *Journal of Applied Polymer Science*, 1984, 29: pp. 2857-2872.
Manosa et al., "Giant solid-state barocaloric effect in the Ni—Mn—In magnetic shape-memory alloy," *Nature Materials*, Jun. 2010, 9: pp. 478-481.
Manosa et al., "The use of shape-memory alloys for mechanical refrigeration," *Functional Materials Letters*, 2009, 2(2): pp. 73-78.
McKelvey et al., "Fatigue-crack propagating in nitinol, a shape-memory and superelastic endovascular stent material," *Journal of Biomedical Materials Research*, Dec. 1999, 47(3): pp. 301-308.
Mischenko et al., "Giant electrocaloric effect in thin-film $PbZr_{0.95}Ti_{0.05}O_3$," *Science*, Mar. 2006, 311: 1270-1271.
National Economic Council, "A strategy for American innovation: Driving towards sustainable growth and quality jobs," 2009 [online]. Retrieved from the Internet: <URL: http://www.whitehouse.gov/administration/eop/nec/StrategyforAmericanInnovation>.
Neese et al., "Large electrocaloric effect in ferroelectric polymers near room temperature," *Science*, Aug. 2008, 321: pp. 821-823.
Ng et al., "Stress-induced phase transformation and detwinning in NiTi polycrystalline shape memory alloy tubes," *Mechanics of Materials*, 2006, 38: pp. 41-56.
Office Action (1st), dated Aug. 7, 2014, in Chinese Patent Application No. 201210105214.6.
Office Action (2nd), dated Apr. 24, 2015, in Chinese Patent Application No. 201210105214.6.
Office Action (3rd), dated Jan. 13, 2016, in Chinese Patent Application No. 201210105214.6.
Office Action, dated Jun. 23, 2015, in Japanese Patent Application No. 2012-086194.
Office Action, dated Feb. 7, 2017, in U.S. Appl. No. 13/431,768.
Office Action, dated Jan. 27, 2015, in U.S. Appl. No. 13/431,768.
Office Action, dated Jul. 27, 2017, in U.S. Appl. No. 13/431,768.
Office Action, dated Jun. 3, 2016, in U.S. Appl. No. 13/431,768.
Office Action, dated Oct. 29, 2015, in U.S. Appl. No. 13/431,768.
Otsuka et al., *Shape Memory Materials*, Cambridge University Press, Cambridge, 1998, pp. 174-177.
Pecharsky et al., "Giant magnetocaloric effect in $Gd_5(Si_2Ge_2)$," *Physical Review Letters*, Jun. 1997, 78(23): pp. 4494-4497.
Picornell et al., "Stress-temperature relationship in compression mode in Cu—Al—Ni shape memory alloys," *Materials Transactions*, 2004, 45(5): pp. 1679-1683.
Qian et al., "Dynamic performance of a compression thermoelastic cooling air-conditioner under cyclic operation mode," *International Refrigeration and Air Conditioning Conference*, Paper 1411, Jul. 2014, 2244: pp. 1-9.

(56) References Cited

OTHER PUBLICATIONS

Qian et al., "Performance enhancement of a compressive thermoelastic cooling system using multi-objective optimization and novel designs," *International Journal of Refrigeration*, 2015, 57: pp. 62-76.

Qian et al., "Study on high efficient heat recovery cycle for solid-state cooling," *International Journal of Refrigeration*, 2015, 55: pp. 102-119.

Qian et al., "Thermodynamics cycle analysis and numerical modeling of thermoelastic cooling systems," *International Journal of Refrigeration*, 2015, 56: pp. 65-80.

Quarini et al., "Solid state refrigeration: Cooling and refrigeration using crystalline phase changes in metal alloys," *Journal of Mechanical Engineering Science*, 2004, 218: pp. 1175-1179.

Shaw et al., "Tips and tricks for characterizing shape memory alloy wire: Part I—differential scanning calorimetry and basic phenomena," *Experimental Techniques*, 2008, pp. 55-62.

Sinyavskii, "Electrocaloric refrigerators: A promising alternative to current low-temperature apparatus," *Chemical and Petroleum Engineering*, 1995, 31(5-6): pp. 295-306.

Smith et al., "The heat capacity of solid Ni—Ti alloys in the temperature range 120 to 80 K," *Journal of Phase Equilibria*, 1993, 14(4): pp. 494-500.

Snyder et al., "Thermoelectric efficiency and compatibility," *Physical Review Letters*, Oct. 2003, 91(14): 148301(4).

TE Technology, Inc., FAQ's & Technical Information [online], 2010. Retrieved from the Internet <URL: http://www.tetech.com/FAQ-Technical-Information.html>.

U.S. Department of Energy, Energy Efficient and Renewable Energy, *2009 Buildings Energy Data Book*, Oct. 2009, D&R International, Ltd.

Westphalen et al., "Energy consumption characteristics of commercial building HVAC systems. vol. 1: Chillers, Refrigerant Compressors, and Heating Systems," Arthur D. Little, Inc. Report for Office of Building Technology, State and Community Programs, U.S. Department of Energy, Apr. 2001.

\* cited by examiner

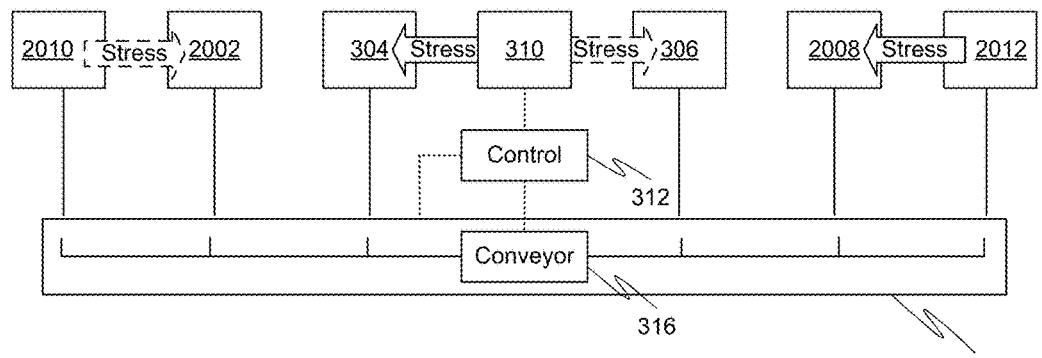
FIG. 18
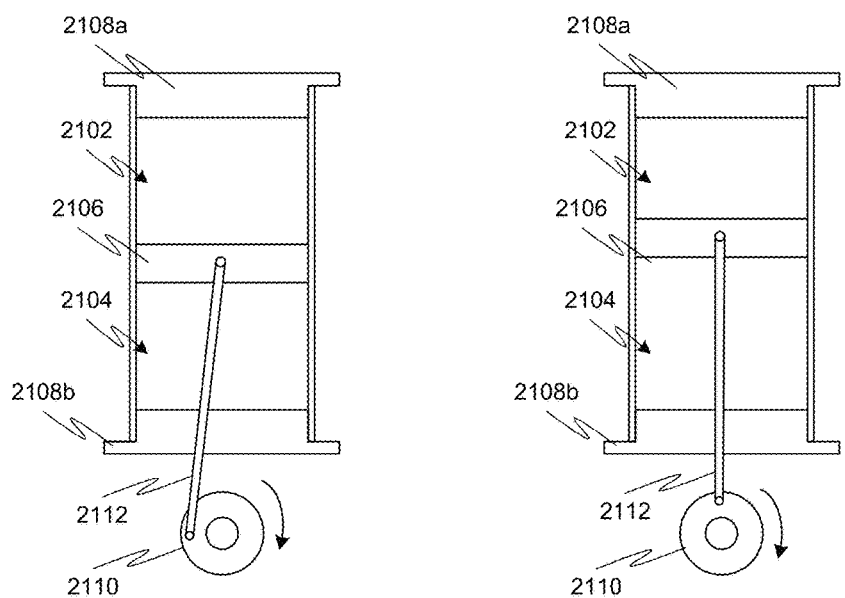
FIG. 19A  FIG. 19B

SOLID-STATE HEATING OR COOLING SYSTEMS, DEVICES, AND METHODS

CROSS-REFERENCE TO RELATED APPLICATIONS AND PAPERS

The present application claims the benefit of U.S. Provisional Application No. 62/052,843, filed Sep. 19, 2014, which is hereby incorporated by reference herein in its entirety.

The present application is also related to U.S. application Ser. No. 13/431,768, filed Mar. 27, 2012, which is hereby incorporated by reference herein in its entirety.

The following publications are also incorporated by reference herein in their entireties: Qian et al., "Performance enhancement of a compressive thermoelastic cooling system using multi-objective optimization and novel designs," *International Journal of Refrigeration*, 2015, 57: pp. 62-76; Qian et al., "Thermodynamics cycle analysis and numerical modeling of thermoelastic cooling systems," International Journal of Refrigeration, 2015, 56: pp. 65-80; and Qian et al., "Study on high efficient heat recovery cycle for solid-state cooling," *International Journal of Refrigeration*, 2015, 55: pp. 102-19.

FIELD

The present disclosure relates generally to solid-state heating or cooling, and, more particularly, to systems, methods, and devices for thermoelastic heating or cooling.

BACKGROUND

Refrigerants such as hydrochloroflurocarbons (HCFCs) and hydrofluorocarbons (HFCs) have been identified as having high global warming potential. Yet, their use has been ubiquitous in modern air-conditioning and refrigeration systems. With increasing concern over global warming and attendant government regulation, there is an increasing need to identify alternative technologies. Beyond identifying substitute refrigerants that can be employed in existing systems, solid-state materials have been considered as a potential solution, especially in view of their lack of global warming potential.

Existing refrigeration technologies employ a vapor compression cycle (VCC) that operates in a continuous manner. In contrast, existing solid-state cooling technologies, such as magnetocaloric, thermoelastic, and electrocaloric systems, operate in a cyclic manner. Moreover, solid-state cooling technologies may enjoy other advantages as compared to VCC technologies, such as reduced noise, lack of high pressure components, and lower maintenance cost.

However, solid-state cooling technologies have had limited market development to date due to a variety of disadvantages. In particular, solid-state cooling systems typically have less useful cooling power as compared to traditional VCC system due to parasitic internal latent heat losses. Such losses may be attributable to the sensible heat required to change the temperature of the refrigerant material between different levels during cyclic operation, for example, the heat sink and the heat source when operating as a heat pump. While both VCC and solid-state refrigeration systems may experience such parasitic losses, solid-state materials typically have much smaller latent heat available than VCC refrigerants.

Embodiments of the disclosed subject matter may address the above-mentioned problems and limitations, among other things.

SUMMARY

Systems, methods, and devices for solid-state heating or cooling are disclosed herein. In particular, a thermoelastic material (also referred to as an elastocaloric material) is used as the solid-state material. A stress-induced transition from a first crystalline phase (e.g., austenite) to a second crystalline phase (e.g., martensite) causes a release of latent heat from the thermoelastic material. Subsequent release of the stress allows the thermoelastic material to absorb latent heat in transitioning back to the first crystalline phase. This cyclic release and absorption of heat can be used as part of a continuous or one-time heating or cooling system, according to one or more of the disclosed embodiments.

In one or more embodiments, a system for heating/cooling can include a plurality of modules, at least one loading device, a fluid network, at least one pump, and a controller. Each of the modules can comprise one or more structures formed of shape memory alloy, which can be constructed to convert from a first crystal phase to a second crystal phase upon application of a first stress and to release latent heat in converting from the first crystal phase to the second crystal phase. Each loading device can be coupled to the modules, or at least one of the modules, and configured to apply a force thereto. The fluid network can be coupled to a heat source and a heat sink, as well as each of the modules. The pump can move heat transfer fluid through the fluid network. The controller can be operatively coupled to the fluid network, each loading device, and each pump. The controller can control the system such that during a first part of a cycle a first of the plurality of modules rejects heat to the heat sink while a second of the plurality of modules absorbs heat from the heat source, and during a second part of the cycle the first and second modules are connected together to transfer heat therebetween.

In one or more embodiments, a method of operating a system for heating/cooling comprises stressing a first module of a plurality of modules. Each of the modules can comprise one or more structures formed of shape memory alloy, which converts from a first crystal phase to a second crystal phase upon application of the stress and releasing latent heat. The method can further comprise dumping heat to a heat sink from the first module and transferring heat from a heat source to a second module of the plurality of modules. The method can further comprise transferring heat from the first module to the second module. The method can also comprise switching roles of the first and second modules and repeating the stressing, dumping heat, and transferring heat with the switched roles.

In one or more embodiments, a thermoelastic or elastocaloric structure can comprise a lattice of connected hollow tubes. Each hollow tube can have an interior volume through which a first fluid can flow. The lattice can have spaces between exterior walls of the hollow tubes such that a second fluid can flow through the lattice without passing through said interior volumes. The hollow tubes can be formed of shape memory alloy, which convert from a first crystal phase to a second crystal phase upon application of a stress and to release latent heat in converting from the first crystal phase to the second crystal phase.

In one or more embodiments, an evaporative cooling system can comprise a module, a loading device, a fluid delivery system, a gas delivery system, a fluid tank, and a pump. The module can comprise one or more structures formed of shape memory alloy, which converts from a first crystal phase to a second crystal phase upon application of a stress and to release latent heat in converting from the first crystal phase to the second crystal phase. The loading device can be coupled to the module and can apply a force thereto. The fluid delivery system can spray the one or more structures of the module with a fluid. The gas delivery system can flow a gas in thermal contact with the one or more structures of the module. The fluid tank can hold the fluid therein and can be disposed so as to receive chilled fluid from the module. The pump can move the fluid from the fluid tank to the fluid delivery system for spraying on said one or more structures.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

FIG. 18 is a generalized schematic diagram of a cascade arrangement of at least four thermoelastic cooling modules, according to one or more embodiments of the disclosed subject matter.

FIGS. 19A-19B illustrate an embodiment of a cooling system employing a pair of thermoelastic cooling modules employing a crank design, where the shape material alloy structures can be any of the configurations disclosed in FIGS. 5A-5I, according to one or more embodiments of the disclosed subject matter.

DETAILED DESCRIPTION

Embodiments of the disclosed subject matter employ one or more structures formed of shape-memory alloy (SMA), which is a group of metal alloys with significant elastocaloric effect. As used interchangeably herein, thermoelastic and elastocaloric refer to a type of material that releases latent heat in response to a stress-induced phase transition from a first crystalline state (e.g., austenite) to a second crystalline state (e.g., martensite). Such a phase transition may be reversible such that upon relaxation of the stress the material absorbs a corresponding amount of latent heat in transitioning from the second crystalline state back to the first crystalline state. Shape-memory alloys that exhibit a thermoelastic effect can include, but are not limited to, NiTi alloys, CuZnAl alloys (e.g., Cu 65-70 wt % and Al 13-23 wt %), CuAlNi alloys (e.g., Cu 80-85 wt % and Al 12-15 wt %), CuZnNi alloys, AuCd alloys, NiMnGa alloys, CuZn alloys, CuSn alloys, CuAlBe alloys, FePd alloys, FeRh alloys, and derivative alloys thereof. For example, in one or more embodiments, the shape-memory alloy is nitinol (i.e., NiTi alloy with 55 wt % of Ni).

This release and absorption of heat can be used by a system to perform heating, cooling, or both heating and cooling. Thus, although embodiments are described herein as an air-conditioning/cooling/refrigeration system or as delivering a cooling function, such embodiments can also be used as a heating system or to deliver a heating function, as will be readily apparent to one of ordinary skill in the art.

The elastocaloric effect can potentially deliver a higher adiabatic temperature span as compared to other cooling modalities, thereby allowing the use of thermoelastic materials as a single stage cycle for air-conditioning and refrigeration applications. Moreover, thermoelastic materials may enjoy superior material performance as compared to other solid-state cooling modalities. The thermoelastic materials can be used for power cycle (where the driving potential is the temperature difference), or applied reversely for thermoelastic cooling/heat pump cycles (where applied stress induces heating).

Figure 1A:
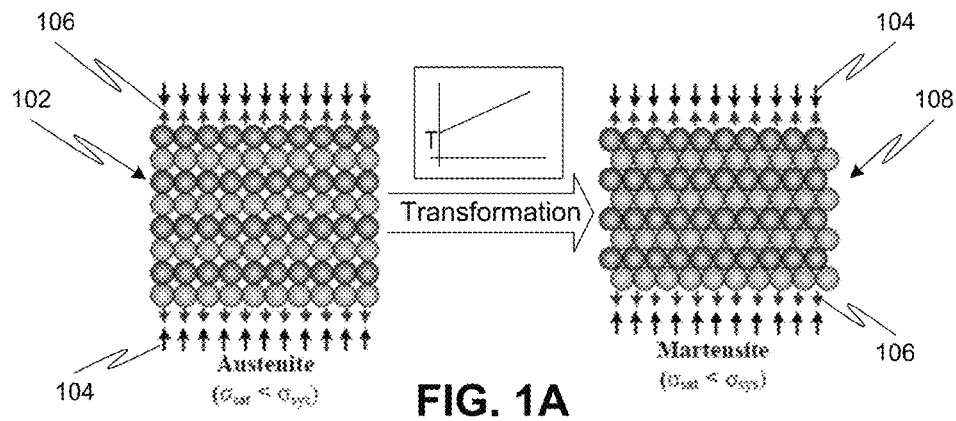
FIG. 1A is a schematic diagram illustrating a stress induced phase change releasing latent heat in a thermoelastic cooling structure, according to one or more embodiments of the disclosed subject matter.

In a cooling/heat pump cycle, the useful cooling/heating effect is the result of the associated latent heat released during the stress-induced phase change process, which causes the material to transition from a first crystalline phase to a second crystalline phase. For example, FIG. 1A shows a shape-memory alloy material in a first crystalline phase 102 (i.e., austenite). When the material is subjected to an external stress 104 ($\sigma_{sys}$) that exceeds the phase change or saturation stress 106 ($\sigma_{sat}$) for the given system temperature, the austenite crystal structure 102 transforms to a martensite crystal structure 108 while simultaneously releasing latent heat that increases the material's temperature during the adiabatic phase change process, as shown by the inset graph in FIG. 1A.

Figure 1B:
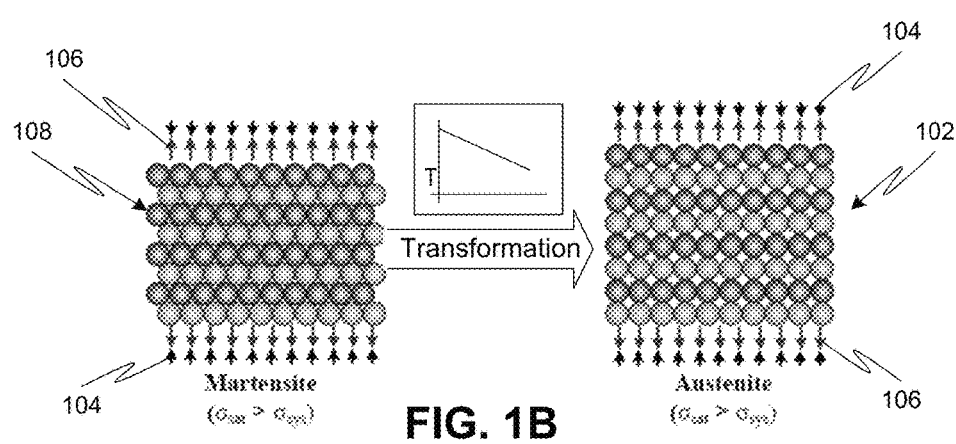
FIG. 1B is a schematic diagram illustrating the release of stress from the thermoelastic cooling structure of FIG. 1A, leading to reversed phase change and absorption of latent heat.

Cooling can take place when the external stress 104 ($\sigma_{sys}$) is less than the phase change stress 106 ($\sigma_{sat}$), as illustrated in FIG. 1B. As the stress 104 decreases below the threshold 106, the material transitions back to the first crystalline state, e.g., the austenite phase 102 while simultaneously absorbing ambient heat from itself and the environment, thereby reducing its temperature and delivering a cooling effect.

The external stress 104 ($\sigma_{sys}$) can be tensile or compressive stress. In one or more embodiments, compression is used instead of tension since compression may serve to enhance the strength of the shape-memory alloy by enlarging its cross-section. In addition, the stress-strain hysteresis of the compression process may be less than that of tension so that less work input may be required.

Figure 2A:
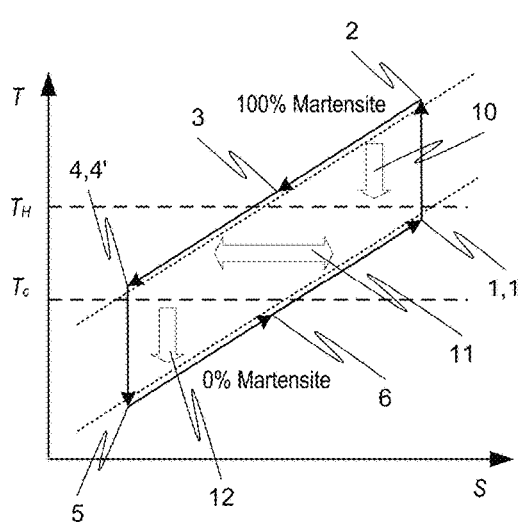
FIGS. 2A-2B are temperature-entropy and stress-strain graphs illustrating a reverse Brayton cycle and its variation as a thermoelastic cooling cycle, according to one or more embodiments of the disclosed subject matter.
Figure 2B:
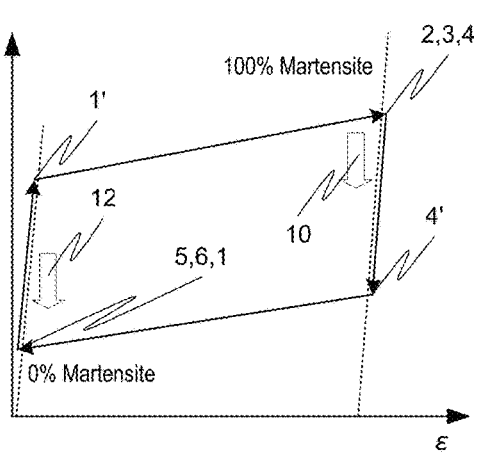

In one or more embodiments, a thermoelastic cooling/heat pump cycle can be achieved via a reverse Brayton cycle, a reverse Stirling cycle, or a hybrid of Brayton and Stirling cycles. The processes of the reverse Brayton cycle are illustrated in FIGS. 2A-2B, while the processes of the Stirling cycle are illustrated in the Qian et al. paper entitled "Thermodynamics cycle analysis and numerical modeling of thermoelastic cooling systems," previously incorporated by reference above. Although the Brayton and Stirling cycles have been specifically discussed herein, embodiments of the disclosed subject matter are not necessarily limited thereto. Indeed, other types of thermodynamic cycles may incorporate the disclosed thermoelastic materials and methods of use thereof according to one or more contemplated embodiments.

Turning to FIGS. 2A-2B, temperature-entropy and stress-strain diagrams are shown illustrating aspects of the reverse Brayton cycle incorporating a thermoelastic material. The cycle includes two isentropic processes and two iso-stress processes, in particular, an adiabatic martensite-austenite phase transition process, a constant strain heat transfer process between the thermoelastic material and the heat sink/source, and a heat recovery process.

Starting at state 1, the thermoelastic material is in an unstressed state, such that its crystalline structure is in the austenite phase. The thermoelastic material is then subjected to an external stress greater than the saturation stress (i.e., $\sigma_{sys} > \sigma_{sat}$), causing it to transition to state 1'. As the crystalline phase transforms from austenite to martensite, heat associated with the crystalline phase change is adiabatically released, thereby causing the temperature to increase (state 1' to state 2).

Transfer of the released heat 10 from the thermoelastic material, for example, to a heat sink at temperature $T_H$, causes its temperature to decrease (state 2 to state 3). Heat transfer to the heat sink can be accomplished with or without a heat transfer fluid (HTF). The HTF in any of the disclosed embodiments can be water, alcohol, or any other heat transfer fluid, including fluids incorporating desired particulates, such as nanoparticles.

As the thermoelastic material's temperature approaches the heat sink temperature, $T_H$, the thermoelastic material still remains fully stressed and in the martensite phase. However, before fully unstressing the thermoelastic material, the temperature of the thermoelastic material can be further reduced (i.e., from state 3 to state 4, also referred to herein as precooling), for example, by exchanging sensible heat with another thermoelastic material undergoing the same cycle but at an opposite state (i.e., at state 6). This heat exchange process is referred to herein as heat recovery (HR), and generally is accomplished using an HTF. Given a 100% heat recovery, the temperature at state 4 may be substantially the same as the temperature at state 6.

Unloading of the stress at this point (i.e., $\sigma_{sys} < \sigma_{sat}$) causes the thermoelastic material to transition to state 4'. As the crystalline phase transforms back to austenite from martensite, heat 12 associated with the crystalline phase change is adiabatically absorbed thereby causing the temperature to further decrease (state 4' to state 5). During the remainder of the cycle (i.e., state 5 back to state 1), the thermoelastic material remains unstressed. The thermoelastic material's cooling power is taken away, for example, by absorbing heat from a heat source at temperature $T_C$, thereby causing the temperature of the thermoelastic material to rise (state 5 to state 6). Heat transfer from the heat source can be accomplished with or without an HTF.

As noted above, the unstressed thermoelastic material at state 6 can exchange heat with another thermoelastic material at state 3 as part of HR, thereby raising the temperature of the unstressed thermoelastic material (state 6 to state 1). The HR process conserves energy, and therefore the heat rejected to heat sink (e.g., at temperature $T_C$) should be equal to the sum of the heat absorbed from the heat source (e.g., at temperature $T_H$) and the work needed to drive one cycle.

It should be noted that the area underneath 1-1'-2 on the stress-strain ($\sigma$-$\epsilon$) diagram is the loading work, and the area underneath 4-4'-1 is the unloading work. In one or more embodiments, the unloading work can be fully used (or at least partially used) to compensate for at least part of the loading work. In other words, unloading by releasing stress from one of the thermoelastic modules can be used for loading (i.e., stressing) the other thermoelastic module, as described in more detail below. Therefore, the area surrounded by the cycle the stress-strain diagram would correspond to the net power input with 100% work recovery.

In other embodiments, a reverse Stirling cycle can be used, as suggested in Qian et al. paper entitled "Thermodynamics cycle analysis and numerical modeling of thermoelastic cooling systems," previously incorporated by reference above. Such a cycle can have two iso-stress heat transfer processes, and two isothermal phase change processes. The cycle can begin with the thermoelastic material in an unstressed state 1. The thermoelastic material can then be stressed prior to the initiation of phase change. In contrast to the reverse Brayton cycle described above, the thermoelastic material can be cooled during the crystal phase transformation process (i.e., from the austenite phase at state 1' to the martensite phase at state 2). As a result, a constant temperature can be maintained for the thermoelastic material despite the release of latent heat due to the phase transformation. The iso-stress heat recovery process (i.e., from state 2 to state 3) is substantially similar to the heat recovery process described above with respect to the reverse Brayton cycle. The unloading process from state 3 to state 4 via state 3' can be accomplished via a isothermal heating process, similar to the isothermal cooling process of state 1 to state 2 via state 1'.

Figure 3:
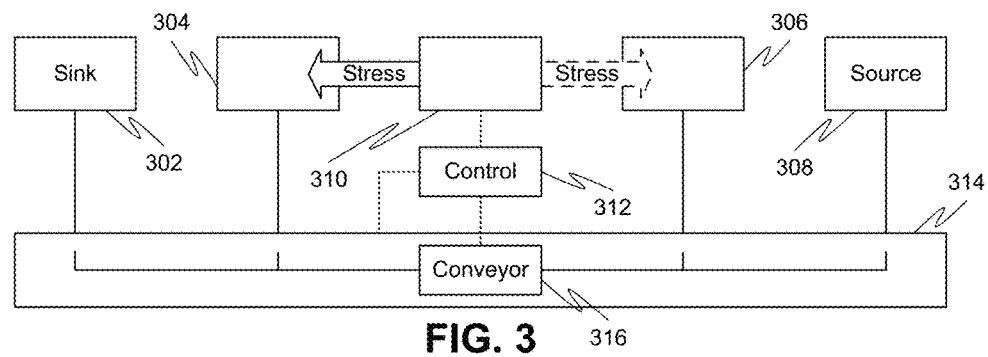
FIG. 3 is a generalized schematic diagram of a solid-state heating/cooling system employing a pair of thermoelastic cooling modules, according to one or more embodiments of the disclosed subject matter.

FIG. 3 is a generalized schematic diagram illustrating aspects of a thermoelastic system that can provide heating or cooling in accordance with the reverse Brayton and/or Stirling cycles described above. The system can include a first thermoelastic module 304 and a second thermoelastic module 306, sometimes referred to as thermoelastic beds or thermoelastic devices. Each thermoelastic module 304, 306 includes one or more structures formed of shape memory alloy exhibiting the desired elastocaloric effect. A loading device 310 can alternately stress the first and second thermoelastic modules 304, such that when the first thermoelastic module 304 is stressed the second thermoelastic module 306 is unstressed, and vice versa.

In some embodiments, the first and second thermoelastic modules 304, 306 may be arranged in a pre-stressed state, such that unloading of one assists the loading device 310 in loading of the other. Thus, when the first module 304 is compressed, the second module 306 is unloaded, and vice-versa. During the loading process of the second module 306, work recovery employs the unloading energy from the first module 304, thereby minimizing or at least reducing the power consumption of the loading device 310.

Although a single loading device 310 has been illustrated in FIG. 3 for providing stress to both thermoelastic modules, a plurality of loading devices is also possible according to one or more contemplated embodiments. For example, a separate loading device 310 can be provided for each thermoelastic module. Moreover, the loading device 310 can be a linear actuator, such as but not limited to a linear screw jack driven by motors or a hydraulic cylinder driven by an oil pump, or any other mechanical driving system known in the art.

The thermoelastic modules 304, 306 can be periodically connected together to allow transfer of heat therebetween via HTF flowing through a reconfigurable fluid network 314. For example, during the heat recovery phase of a thermodynamic cycle, HTF in the fluid network 314 can be conveyed by a fluid conveyor 316, such as one or more pumps, between the first thermoelastic module 304 and the second thermoelastic module 306. During different phases of the thermodynamic cycle, the reconfigurable fluid network 314 can optionally connect the thermoelastic modules 304, 306 to a heat source 308 or a heat sink 302 to allow transfer of heat therebetween. For example, when the first thermoelastic module 304 is stressed, the fluid network 314 may connect the heat sink 302 to the first thermoelastic module 304 to allow HTF to flow therebetween and transfer heat, while a separate connection is made by the fluid network 314 between the heat source 308 and the unstressed second thermoelastic module 306 to allow HTF to flow therebetween and transfer heat. Alternatively, as referenced above, heat transfer between the thermoelastic modules 304, 306 and the heat sink 302 or heat source 308 may be accomplished without flowing of HTF.

A controller 312 (i.e., control system incorporating electronic circuitry and/or non-transitory computer readable medium) can be operatively coupled to the loading device 310, the fluid conveyor 316, and/or the reconfigurable fluid network 314 to effect control thereof. The reconfigurable fluid network 314 can include various fluid control elements, such as but not limited to fluid valves and flow switches, to direct HTF between various elements of the system. In addition, the controller 312 can receive input from various sensors, such as flow-mass sensors and temperature sensors, as well as user or external system inputs/outputs, and can regulate operation of the system responsively thereto. For example, the controller 312 may monitor a temperature in a habitable space that serves as the heat source 308 or heat sink 302 to effect temperature control of the habitable space.

The controller 312 can the control fluid control elements of the fluid network 314 to reconfigure flow paths therein depending on the phase of the heating/cooling cycle. For example, the controller 312 can control the fluid network 314 such that, during a first phase of the cycle, the first thermoelastic module 304 is connected to the heat sink 302 while the second thermoelastic module 306 is connected to the heat source 308. During a recovery phase of the cycle, the controller 312 can further direct the fluid network 314 to connect the first and second thermoelastic modules 304, 306 together. During a subsequent phase of the cycle, the controller 312 can control the fluid network such that the first module 304 is now connected to the heat source 308 while the second module 306 is connected to the heat sink 302.

Figure 4A:
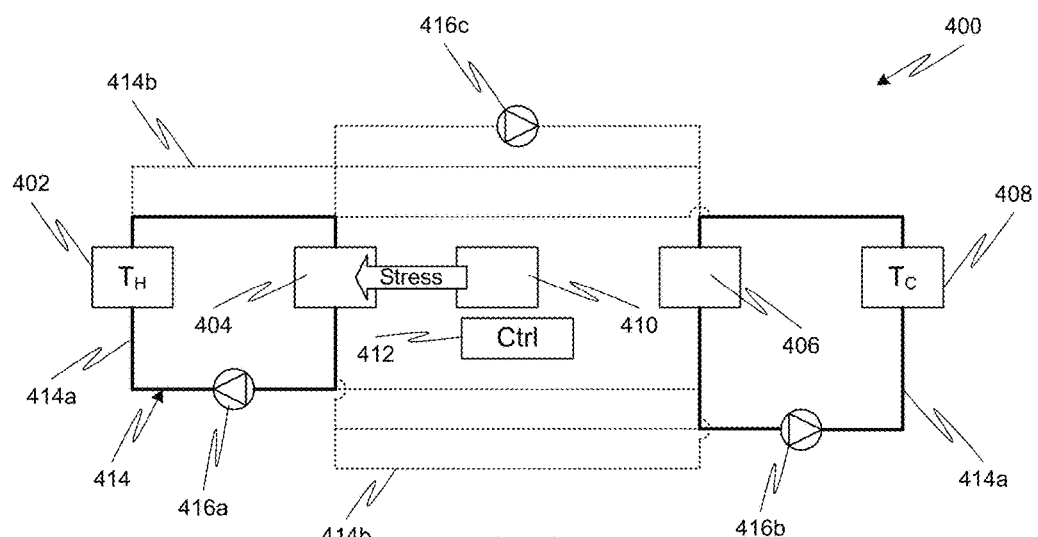
FIG. 4A is a schematic diagram of an embodiment of a solid-state heating/cooling system employing a pair of thermoelastic cooling modules during a first phase of operation, according to one or more embodiments of the disclosed subject matter.
Figure 4B:
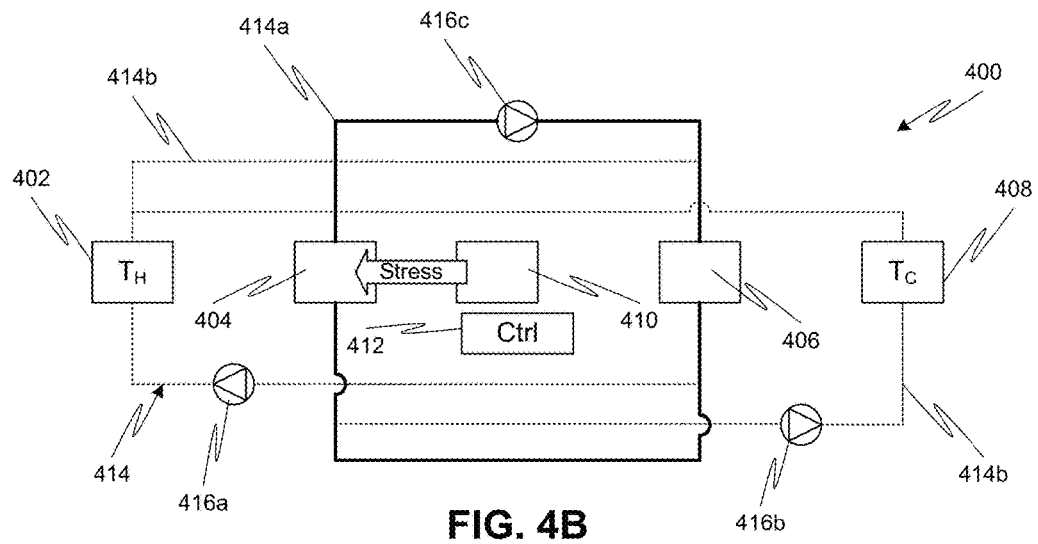
FIG. 4B shows the solid-state heating/cooling system of FIG. 4A during a heat recovery or regeneration phase of operation.
Figure 4C:
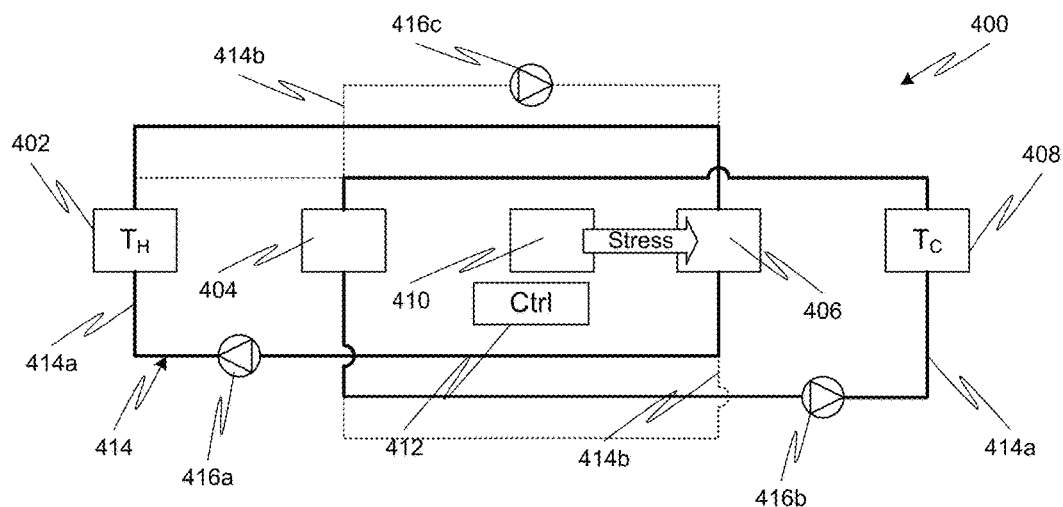
FIG. 4C shows the solid-state heating/cooling system of FIG. 4A during a second phase of operation after heat recovery, where the roles of the pair of thermoelastic cooling modules have been reversed.

Referring to FIGS. 4A-4C, configurations of a thermoelastic cooling system 400 during different phases of operation of a reverse Brayton cycle are illustrated. In particular, FIG. 4A illustrates configuration of the system 400 during a first phase of operation when a first thermoelastic module 404 is stressed and a second thermoelastic module 406 is unstressed. FIG. 4B illustrates configuration of the system 400 during a recovery phase when the thermoelastic modules 404, 406 are connected together. FIG. 4C illustrates configuration of the system 400 during a second phase of operation when the second thermoelastic module 406 is stressed and the first thermoelastic module 404 is unstressed, in effect switching roles of the first and second thermoelastic modules 404, 406 within the system as compared to the first phase.

Referring to FIG. 4A, system 400 includes a first thermoelastic module 404, a second thermoelastic module 406, a loading device 410, a controller 412, a reconfigurable fluid network 414, and a plurality of pumps 416a-416c. As discussed above, the controller 412 can be operatively coupled (not shown) to the loading device 410, the reconfigurable fluid network 414, and the plurality of pumps 416a-416c to control operation thereof. The controller 412 can cause the loading device to stress the first thermoelastic module 404 while leaving the second thermoelastic module 406 unstressed. However, loading (stressing) and unloading (de-stressing) of the thermoelastic modules 404, 406 may occur prior to initiation of flow of HTF through the active flow paths 414a, corresponding to state transitions 1-1'-2 and 4-4'-5, respectively, in FIGS. 2A-2B.

The controller 412 can then cause the fluid network 414 to have active flow paths 414a (solid bold lines) and inactive flow paths 414b (dotted lines), and to control pumps 416a-416b to convey HTF along the active flow paths 414a, as illustrated in FIG. 4A. Thus, the stressed thermoelastic module 404 is thermally connected to the heat sink 402 via HTF circulated by pump 416a in active flow paths 414a while the unstressed thermoelastic module 406 is thermally connected to the heat source 408 via HTF circulated by pump 416b in separate active flow paths 414a. Thus, thermoelastic module 404 is cooled via heat rejection to the heat sink 402 (i.e., state 2 to state 3 transition in FIGS. 2A-2B), while thermoelastic module 406 is heated via heat absorption from the heat source 408 (i.e., state 5 to state 6 transition in FIGS. 2A-2B).

When the temperature of the first thermoelastic module 404 approaches the temperature of the heat sink 402 ($T_H$) and the temperature of the second thermoelastic module 406 approaches the temperature of the heat source 408 ($T_C$), the controller 412 can cause the fluid network 414 to switch active 414a and inactive 414b flow paths to effect the HR phase of the cycle, as illustrated in FIG. 4B. Thus, the stressed thermoelastic module 404 is thermally connected to the unstressed thermoelastic module 406 via HTF circulated by pump 416c in new active flow path 414a. The HR phase precools thermoelastic module 404 (i.e., state 3 to state 4 in FIGS. 2A-2B) so that the unloading process can achieve lower temperatures, thereby resulting in higher cooling capacity.

It should be noted that the HR process favors materials with higher specific heat, since the process saves more internal parasitic sensible heat for higher specific heat materials. Any insufficient heat transfer can lead to significant performance deterioration. However, for typical operating conditions described herein and in the incorporated by reference publications, the effectiveness is usually greater than 0.8. With HR efficiency approaching 100%, the first and second thermoelastic modules 404, 406 in effect swap their temperatures (e.g., progressing from state 3 to 4 and from state 6 to 1 in FIG. 2A).

At the end of the heat recovery phase, e.g., when the temperature of the first thermoelastic module 404 approaches that of the heat source 408 ($T_C$ and the temperature of the second thermoelastic module 406 approaches that of the heat sink 402 ($T_H$), the controller can cease flow of HTF and cause loading device 410 to unload the first thermoelastic module 404 while stressing the second thermoelastic module 406 (state transitions 4-4'-5 and 1-1'-2, respectively, in FIGS. 2A-2B).

The controller 412 can cause the fluid network 414 to again switch active 414a and inactive 414b flow paths to effect the second phase of the cycle, as illustrated in FIG. 4C. In effect, the roles of the first and second thermoelastic modules 404, 406 have been reversed by the reconfiguration of the fluid network 414, with the first thermoelastic module 404, now unstressed, being connected to the heat source 408 and the second thermoelastic module 406, now stressed, being connected to the heat sink 402. The process can proceed in a similar manner as FIG. 4A, with the roles of the thermoelastic modules switched, until HR is needed, as in FIG. 4B. The controller can iteratively repeat the process, switching roles of the first and second thermoelastic modules after each HR phase, to provide semi-continuous heating or cooling.

As discussed above, the thermoelastic modules employed in disclosed systems comprise one or more structures formed of a shape-memory alloy. Unlike fluid refrigerants used in VCC systems, solid-state materials used in thermoelastic cooling have unique shapes and geometries, which can contribute to the transient behavior during the heat transfer and HR processes. Various structures for the shape-memory alloy are possible according to one or more contemplated embodiments.

Figure 5A:
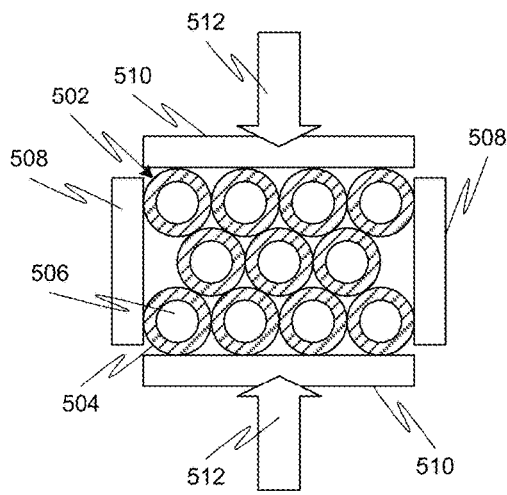
FIG. 5A illustrates a first exemplary structure of a shape memory alloy, with radial application of stress, for use as a thermoelastic cooling module, according to one or more embodiments of the disclosed subject matter.
Figure 5B:
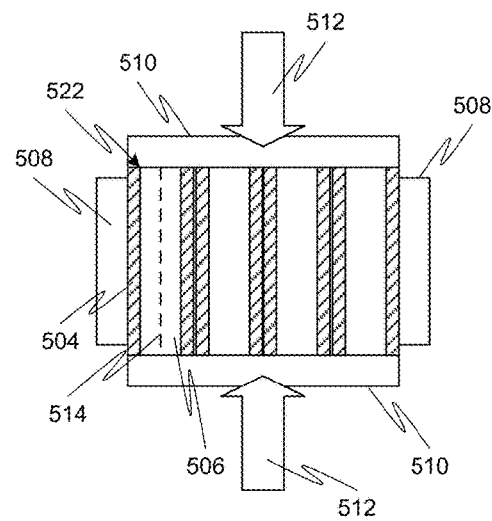
FIG. 5B illustrates a second exemplary structure of a shape memory alloy, with axial application of stress, for use as a thermoelastic cooling module, according to one or more embodiments of the disclosed subject matter.

For example, FIGS. 5A-5B illustrate arrays of shape-memory alloy structures that can be used in the disclosed thermoelastic modules. In FIG. 5A, the array 502 includes multiple tubes 504, each with a hollow interior 506, and supported by walls 508 of a thermoelastic module. Force application 512 by one or more load plates 510 can be directed perpendicular to the axes of the tubes 504, e.g., in a radial direction of the tubes 504. FIG. 5B illustrates an alternative arrangement of tubes 504 as an array 522 with axes 514 parallel to the direction of force application 512.

Each of the tubes 504 in FIGS. 5A-5B can have the same dimensions, e.g., inner and outer diameters, length, and inner volume 506. The walls 508 can surround the array of tubes on each side and along the entire length of the tubes. The tubes 504 can be disposed in a hexagonal close packed (HCP) arrangement, which may help uniformly distribute stress and/or minimize the amount of space occupied by the tubes. However, other arrangements, shapes, and configurations are also possible according to one or more contemplated embodiments. For example, rather than circular tubes disposed in an HCP arrangement, the thermoelastic module can include tubes having a square or rectangular cross-section and disposed in a rectangular array arrangement, or tubes having a hexagonal cross-section and disposed in an HCP arrangement.

When the one or more structures of the thermoelastic modules comprises an array of tubes, the length of these tubes can impact the system coefficient of performance (COP) and cooling capacity. Longer tube length slightly reduces the fluid heat transfer driven potential since the fluid temperature changes more along the tubes. Therefore, tube length has a slightly negative impact on the heat transfer effectiveness, i.e., reducing it from 0.87 to 0.8. HR is considered to be more reversible with a longer tube length. Therefore, tube length can have a slightly positive impact on HR efficiency h, i.e., increasing it from 0.4 to 0.46.

In some embodiments, one or more of the tubes in an array (such as the shape-memory alloy structures or thermoelastic modules illustrated in FIGS. 3-4C, 5A-5B, 5G-5I, and 12-19B) can include a smaller tube (or multiple tubes) or a rod (or multiple rods) enclosed within an interior volume thereof, as illustrated in FIGS. 5C-5F. A rod or small tube, or multiples thereof, inserted into a regular tube can increase the heat transfer area to volume ratio while also decreasing HTF thermal mass within the tubes. Therefore, adding such smaller tubes or rods can enhance the capacity and COP. Also, inserting small tubes has the same surface heat transfer area as the small rods but with less volume per regular tube and, therefore, has a higher heat transfer surface to volume ratio. A higher ratio results in higher heat transfer area between HTF and the shape-memory alloy so that more cooling can be transferred in a certain time frame, or heat transfer can be accomplished within a shorter duration of time. This ratio can thus enhance the time constant related to the heat transfer dynamics.

Figure 5C:
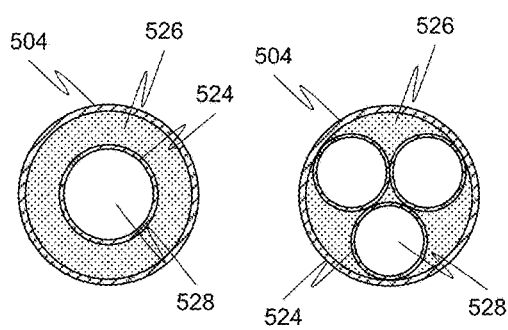
FIG. 5C illustrates a third exemplary structure of a shape memory alloy employing a tube within a tube arrangement, for use as a thermoelastic cooling module, according to one or more embodiments of the disclosed subject matter.
Figure 5D:
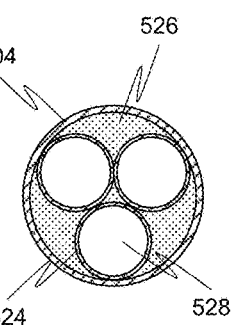
FIG. 5D illustrates a fourth exemplary structure of a shape memory alloy employing a multiple tube within a single tube arrangement, for use as a thermoelastic cooling module, according to one or more embodiments of the disclosed subject matter.
Figure 5E:
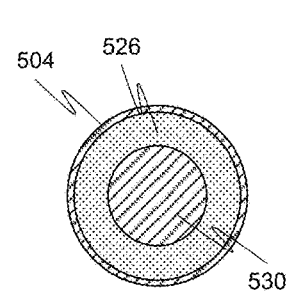
FIG. 5E illustrates a fifth exemplary structure of a shape memory alloy employing a rod within a tube arrangement, for use as a thermoelastic cooling module, according to one or more embodiments of the disclosed subject matter.
Figure 5F:
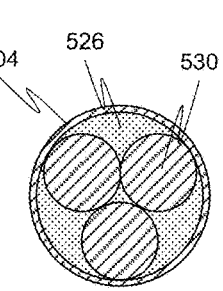
FIG. 5F illustrates a sixth exemplary structure of a shape memory alloy employing a multiple rod within a single tube arrangement, for use as a thermoelastic cooling module, according to one or more embodiments of the disclosed subject matter.

FIG. 5C shows an example of a tube-in-tube design, where HTF (e.g., water or other fluid) flows only in the interior volume 526 (i.e., the annular region) between the inner tube 524 and the outer tube 504. The inner tube 524 can be formed of the same material as the outer tube 504, i.e., both can be formed of the same shape-memory alloy, or different materials. The inner tube 524 can have its interior volume 528 sealed such that no HTF can flow therethrough. Although only a single inner tube 524 is illustrated in FIG. 5C, additional inner tubes 524 can be disposed within the inner volume 526 of tube 504. For example, three tubes 524 can be arrayed within tube 504, as shown in FIG. 5D, with HTF flowing in spaces or voids between outer surfaces of inner tubes 524 and the inner surface of the outer tube 504. FIGS. 5E-5F illustrate structures similar to FIGS. 5C-5D, but with solid rods 530 instead of inner tubes 524. Other numbers and arrangements of inner tubes 524 and/or solid rods 530 are also possible according to one or more contemplated embodiments.

Figure 5G:
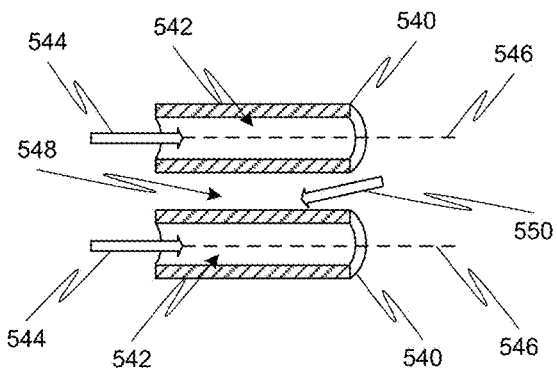
FIG. 5G is a generalized schematic diagram of a cross-section of a shape memory alloy structure enabling two separate flow paths for fluid, for use as a thermoelastic cooling module, according to one or more embodiments of the disclosed subject matter.

In one or more embodiments, the shape-memory alloy structure employed in the thermoelastic module can be constructed to provide separate paths for flow of HTF therethrough. The separate flow paths may be isolated from each other to allow simultaneously flow of HTF along the different paths. Alternatively, the separate flow paths may be employed during different parts of the operating cycle. For example, as illustrated in FIG. 5G, a thermoelastic module can include hollow structures 540 formed of a shape-memory alloy and arranged with a first flow path 548 between adjacent structures 540. A second flow path 544, isolated from the first flow path 548, can be provided within the hollow interior 542 of each hollow structure 540. During one phase of operation, HTF 544 can be directed to flow in the interior volume 542 along a length (e.g., parallel to axis 546) of each structure 540.

During another phase of operation, HTF 550 can be directed to flow along the exterior of the structures 540 in the space 548 between the structures 540. HTF 550 may be the same or different than the HTF 544. For example, HTF 550 flowed along the exterior of the structures 540 can be air while HTF 548 flowed in the interior 542 of the structures 540 can be a liquid, such as water or alcohol. Although HTF 550 is illustrated as flowing in a direction crossing the longitudinal extent 546 and the flow direction of HTF 544 in FIG. 5G, other flow directions are also possible. For example, HTF 550 can proceed parallel to the longitudinal extent 546, either in the same direction or the opposite direction as HTF 544, but along the exterior of structures 540.

Figure 5H:
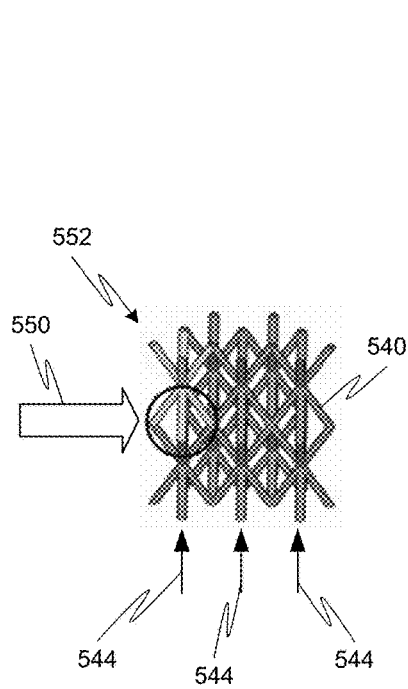
FIGS. 5H-5I illustrate an overview and close-up cross-sectional view, respectively, of a mesh or lattice structure for a shape memory alloy enabling two separate flow paths for fluid, for use as a thermoelastic cooling module, according to one or more embodiments of the disclosed subject matter.
Figure 5I:
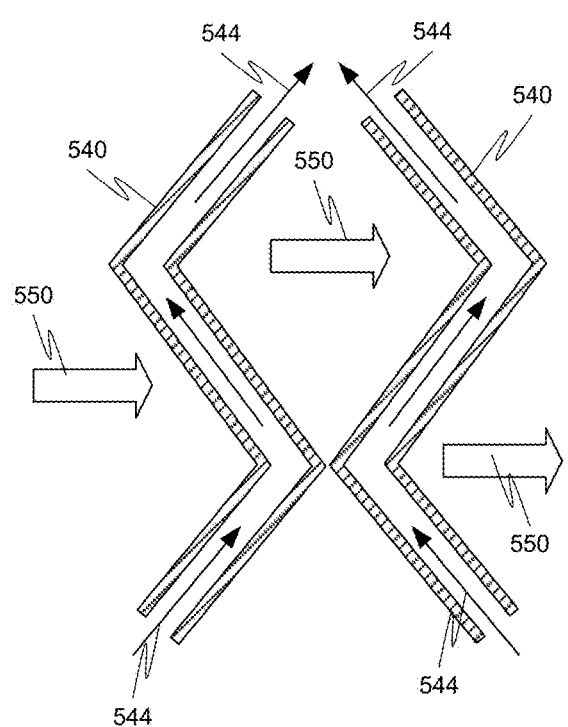

FIGS. 5H-5I illustrate an example of hollow structures 540 formed of shape-memory alloy and configured as a mesh or lattice 552. Mechanical stress can be applied either in the horizontal or vertical direction and leads to a deformation of the lattice 552. The latent energy released by the hollow structures 540 can be transferred to HTF 544 (e.g., water or other liquid) flowing through these hollow structures 540. Due to the shape of the flow paths, the heat transfer between the hollow structures 540 and HTF 544 can reach a maximum amount, or at least be increased.

At the same time as the flowing of HTF 544, or at a different time, a second HTF 550 (e.g., air or other fluid) can be cross-flowed through the lattice 552 so as to provide further heat exchange. The structures 540 may have relatively thin walls and diameters. As a result of the hollow structure 540 dimensions and the meandering (i.e., zigzag) flow path of HTF 544, heat transfer between HTF 544 and HTF 550, when flowing simultaneously, can also be maximized or at least increased. After compression, another HTF stream can be directed into the hollow structures 540 (e.g., along the same flow path as HTF 544, either in the same direction or in an opposite direction) and pick up the cooling created by the lattice 552 in the recovery stage. Such a design can eliminate the need for additional heat exchangers (e.g., air-to-water heat exchanger), which may otherwise be used to transfer heat from HTF 544 to the conditioned space.

In any of the structures disclosed in FIGS. 5A-5I, where hollow structures or tubes have been discussed, it is further contemplated that such hollow structures/tubes can be replaced with solid structures, for example, rods or wires. Similar requirements (e.g., dimensions and material properties, supporting structures, array arrangement, etc.) as noted above for the hollow structures/tubes would apply to the rods/wires as well.

For example, structures 540 in FIGS. 5G-5I can be solid instead of hollow. In such configurations, alternating flow paths for HTF 544 may be provided similar to the flow path for HTF 550. For example, an array of structures 540 can be defined with an overall outer boundary or surface, with HTF 544 flowing along and exchanging heat with this outer boundary so as to effect heating/cooling, while HTF 550 is allowed to flow between individual structures 540 of the array so as to effect preheating/precooling (i.e., heat recovery). Alternatively, HTF 544 can flow along and exchange heat with the outer boundary or surface of the array of structures 540 so as to effect preheating/precooling (i.e., heat recovery), while HTF 550 is allowed to flow between individual structures 540 of the array so as to effect heating/cooling.

Figure 6:
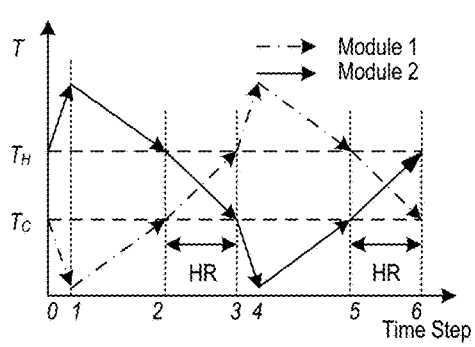
FIG. 6 is a graph illustrating aspects of a cooling cycle employing a pair of thermoelastic cooling modules with heat recovery, according to one or more embodiments of the disclosed subject matter.

Turning to FIG. 6, aspects of a reverse Brayton cycle employing a pair of thermoelastic modules with HR are illustrated. The beginning of the first half cycle (i.e., time step 0 to time step 1) and the beginning of the second half cycle (i.e., time step 3 to time step 4) are adiabatic processes, which occur when loading/unloading of the thermoelastic module (i.e., stressing or unstressing) causes the release/absorption of latent heat. The second parts (i.e., time step 1 to time step 2, and time step 4 to time step 5) are the heat transfer processes between the shape-memory alloy structures of the thermoelastic modules and the respective HTF flows from the heat sink ($T_H$) and heat source ($T_C$). The HR processes (i.e., time step 2 to time step 3, and time step 5 to time step 6) follow these heat transfer processes. As noted above, the HR process (i.e., regeneration or recuperation) is represented by the internal heat transfer between the thermoelastic modules. The temperatures of the thermoelastic modules essentially switch between $T_C$ and $T_H$ via the HR process.

From an energy flow standpoint, during time steps 0 to 1 and 3 to 4, the loading/unloading provides the heating/cooling effect, which is later transferred to the heat source and heat sink via the heat transfer processes during time steps 1 to 2 and 4 to 5. In contrast, the HR process does not generate any cooling or heating effect. Rather, it is merely driven by a previously formed temperature difference.

In particular, HR is used to recuperate the sensible heat between the shape-memory alloy structures of the pair of thermoelastic modules, which can be designed to have the same amount of thermal mass. For example, a first thermoelastic module can start at a relatively low temperature, e.g., $T_C$ in FIG. 6, while a second thermoelastic module can start at a relatively high temperature, e.g., $T_H$ in FIG. 6. The driving potential of the isolated HR process is the preset temperature difference before the HR process. The objective is to "swap" the temperature levels between these two thermoelastic modules. Since the shape-memory structures of the thermoelastic modules do not flow like a fluid, HTF flowing between the thermoelastic modules is used to achieve the desired "temperature swap." During the HR process, HTF absorbs sensible energy from second thermoelastic module and provides cooling thereto at the same time. HTF then delivers the absorbed heat to the first thermoelastic module. To conserve energy, the amount of energy taken from second thermoelastic module should be the same as that absorbed by first thermoelastic module.

Direct contact of the structures of the first and second thermoelastic modules will result in temperature equilibration, given sufficient duration. However, embodiments of the disclosed subject matter employing thermal wave HR, as described in further detail below, can achieve even higher efficiencies such the first thermoelastic module has a temperature higher than that of the second thermoelastic module at the end of HR. Ideally, the use of thermal wave HR can result in a complete swap of temperatures between the thermoelastic modules, i.e., such that the second thermoelastic module is cooled to a temperature identical to the initial temperature of the first thermoelastic module ($T_C$) and vice versa. In practice, the swap may be incomplete due to limited heat transfer ability, heat losses, and other factors.

The thermal-wave HR uses HTF as the regenerator of the thermoelastic modules and achieves a thermal-wave by varying fluid inlet temperature into the thermoelastic modules. The thermal-wave HR cycle is similar to the concept of a simple counter-flow heat exchanger, where the inlet temperature of a first flowing fluid is lower than that of a second flowing fluid. If the two flow streams share the same flow heat capacity rate and the heat transfer area is infinite, the outlet temperature of the first fluid will be the same as the inlet temperature of the second fluid, although in practice the outlet temperature of the first fluid is lower than this ideal due to system losses. The motivation underlying this "counter-flow" design is to minimize the temperature difference between two flow streams everywhere throughout the heat exchanger.

The counter-flow motivation can be applied to the HR process, but on a time scale, i.e., controlling the flows such that the temperature difference between the shape-memory alloy structures of each thermoelastic module and the HTF in contact therewith should be minimized everywhere at any time. Thus, the HTF entering each thermoelastic module should have a minimum temperature difference with respect to a temperature of the shape memory alloy structures of the respective thermoelastic module at any moment throughout the HR process. Thus, the inlet fluid temperatures for the first and second thermoelastic modules will vary with time to achieve the "counter-flow" motivation, so that the first thermoelastic module is heated gradually through one "counter-flow in time" process while the second thermoelastic module is cooled down steadily through another one. Note that the conduction inside the shape-memory alloy structures of the thermoelastic modules is faster than any heat transfer between thermoelastic modules and the flowing HTF.

Figure 7:
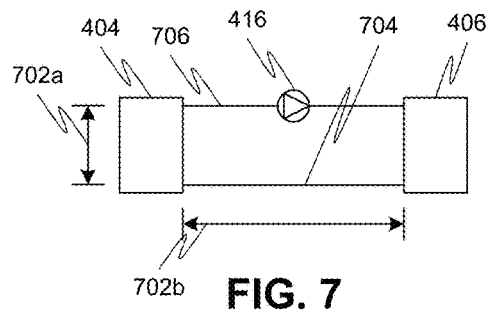
FIG. 7 is a generalized schematic diagram of a pair of thermoelastic cooling modules during a heat recovery phase and features of the fluid network, according to one or more embodiments of the disclosed subject matter.

At any time during the HR process, fluid between the first and second thermoelastic modules (e.g., in a fluid conduit or pipe connecting between the outlet of one of the thermoelastic modules and the inlet of another of the thermoelastic modules) has a temperature profile (e.g., a linear temperature gradient) that varies between the initial temperatures of the thermoelastic modules. Considering the structure of FIG. 7, a first thermoelastic module 404 and a second thermoelastic module 406 are illustrated during an HR process, whereby HTF is conveyed by pump 416 along a first fluid conduit 706 connecting an outlet of first module 404 to an inlet of second module 406 and along a second fluid conduit 704 connecting an outlet of second module 406 to an inlet of first module 404. The first thermoelastic module 404 can have an initial temperature $T_A$ less than an initial temperature $T_B$ of the second thermoelastic module 406.

Taking the inlet of the first thermoelastic module 404 as an example, hotter HTF arrives at the inlet of the first thermoelastic module 404 later than colder HTF. As a result, the HTF temperature at the inlet of the first thermoelastic module 404 varies from $T_A$ to $T_B$ as the HTF travels the distance 702b of the fluid conduit 704 between the thermoelastic modules 404, 406. Thus, the HTF between thermoelastic modules with initial temperatures of $T_A$ and $T_B$ can be used to achieve "counter-flow" HR. Note that distance 702a represents the distance the HTF travels through each thermoelastic module 404, 406, and thus the sum of distances 702a and 702b (i.e., from an outlet of one of the thermoelastic modules to an outlet of the other of the thermoelastic modules) can be considered the wavelength of the thermal wave HR process.

Given a temperature gradient between the thermoelastic modules, the thermal wave can be setup and self-enhanced naturally, once the HR cycle duration is appropriately controlled. In particular, when the cycle duration is controlled to be $t_1$ (defined further below), the system reaches a cyclic steady state such that a smooth HTF temperature profile approaching the desired linear distribution is established within the connecting conduits 704, 706. As used herein, cyclic steady state refers to temperatures that vary periodically over cycles at each location in the system.

Prior to initiation of any heating/cooling or HR phases, all materials in the system can be considered in thermal equilibrium—in other words, the temperature is uniform at an intermediate level. In contrast, at the beginning of the HR phase, the first thermoelastic module is at temperature $T_C$ while the second thermoelastic module is at temperature $T_H$. Thus, as a first portion of HTF passes through the second thermoelastic module during the HR phase, its temperature drops slightly and generates a "temperature peak" or a spike in the first time step. A second portion of HTF flows in and contacts the structures of the second thermoelastic module in the next time step, but this second portion absorbs less heat than the first. This second portion of HTF will subsequently pass to the first thermoelastic module during the next half heat recovery cycle, and the HTF will be further cooled down with the development of the "low temperature peak". The accumulation of the newly developed peaks eventually results in the desired temperature profile. As the HR cycle continues, when both the "hot peak" in the second portion of HTF and the "cold peak" in the first portion of the HTF are fully developed and do not change over cycles, the desired HTF with temperature distribution between $T_C$ and $T_H$ in the fluid conduits. This "naturally-generated" temperature gradient is an evolving result from any initial temperature profile to the cyclic steady state temperature profile.

Figure 8A:
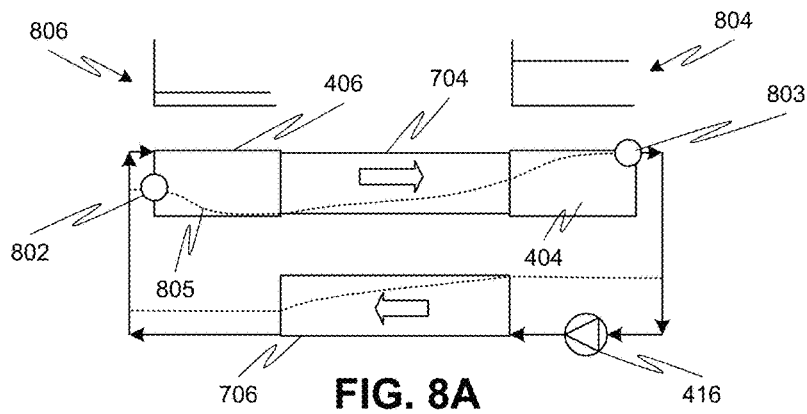
FIGS. 8A-8C demonstrates aspects of thermal wave propagation by illustrating temperature profiles during different times of the heat recovery phase, $t/t_{HR}$=0.05, 0.7, and 0.99, respectively, in the fluid conduits and the thermoelastic cooling modules during a single heat recovery process, according to one or more embodiments of the disclosed subject matter.
Figure 8B:
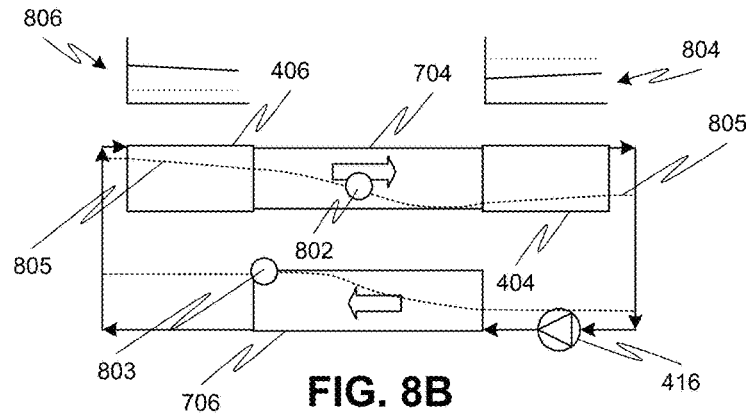
Figure 8C:
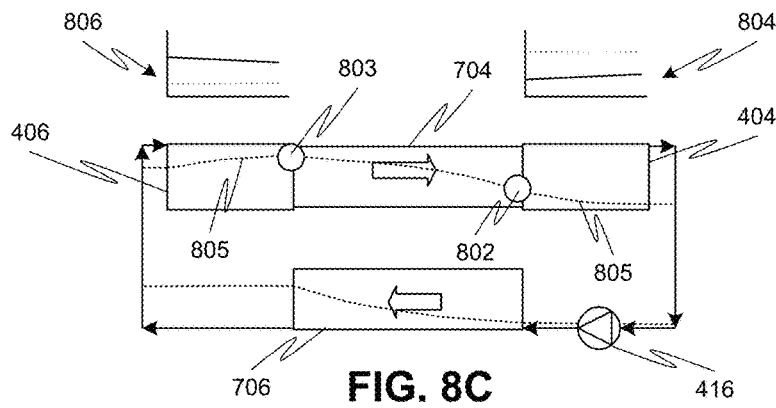

FIGS. 8A-8C present a thermal wave HR configuration and its working principle, according to one or more embodiments of the disclosed subject matter. A first thermoelastic module 404 and a second thermoelastic module 406 are connected together by a first conduit 704 and a second conduit 706 such that HTF can be conveyed by a pump 416 therebetween. In FIG. 8A, the HR process starts with the second thermoelastic module 406 at a relatively low temperature and the first thermoelastic module 404 at a relatively high temperature. With HTF flowing in the system, the temperature of module 406 (shown at 806) rises gradually as does the temperature of HTF at the inlet of module 406 (temperature of HTF indicated by curve 805), as indicated by the progression from FIG. 8A (time of $t/t_{HR}=0.05$) to FIG. 8B (time of $t/t_{HR}=0.7$, where $t_{HR}$ refers to the total cycle time for the HR phase) to FIG. 8C (time of $t/t_{HR}=0.99$). Similarly, the temperature of module 404 (shown at 804) gradually decreases, as does the temperature of HTF at the inlet of module 404, as indicated by the progression from FIG. 8A to FIG. 8B to FIG. 8C. Finally the temperature 806 of module 406 reaches a maximum and the temperature of the HTF at the inlet thereof starts to decrease, which indicates the end of the HR process.

This time-variant HTF temperature is a result of the moving "thermal wave" inside the fluid conduit 704 between modules 406, 404. Earlier, the ideal HR cycle was determined to have a linear temperature distribution. However, the temperature profile snapshots presented in FIGS. 8A-8C are based on an experimentally validated model, and thus deviate from the idealized linear distribution. Nevertheless, use of the thermal wave HR phase allow improved heat recovery and system performance than would otherwise be available.

Focusing on the HTF temperature at the inlet of module 406 as compared to the shape-memory alloy structure temperature, it is noted that the two temperatures increase with almost a uniform temperature difference at any time step before 70% of the HR process (i.e., $t/t_{HR}=0.7$, FIG. 8B), where the heat is from HTF with stored temperature profile in the conduit 706. The remaining 30% of the process (i.e., from FIG. 8B to FIG. 8C) is additional heating due to delay caused by the finite module length (i.e., length 702a in FIG. 7).

In FIGS. 8A-8C, the temperature profiles in the conduits 704, 706 are close to but not exactly linear. The deviation from the ideal linear profile is due to a degree of irreversibility inherent in real-world practical systems. Overall, the almost linear temperature profile within the fluid conduits 704, 706, as well as portions of modules 404, 406 function equivalently to the ideal thermal wave HR concept presented above.

In FIGS. 8A-8C, tracing particles 802 and 803, which are particles of the HTF as it flows through the system, are illustrated. During the HR process, the two tracing particles 802, 803 travel the same distance, e.g., approximately the length of one module (i.e., 702a) plus the length of one fluid conduit (i.e., 702b). In the ideal case, the cycle duration $t_1$ is given by the time required for transit through a single fluid conduit, i.e., length 702b, since the length of solid bed is negligible.

Note that in FIGS. 8A-8C, the thermal-wave peak amplitude reduces as HTF travels through the fluid conduits 704, 706. In other words, walls of the fluid conduits 704, 706 acts as a damping force to the transient thermal-wave. In the ideal case, the peak amplitude reduces much slower, since the damping effect caused by the walls of the fluid conduits 704, 706 is zero. Moreover, there is slight temperature difference along the modules 404, 406 during the HR process, as indicated at 804, 806 in FIGS. 8B-8C. Based on the "counter-flow in time scale" principle, the temperature gradient inside each module itself neutralizes part of the additional heating/cooling, thereby limiting HR efficiency. As a result, a shorter module (i.e., a reduction in length 702a) can potentially improve HR efficiency. Again, in the ideal case, the length 702a is presumed to be zero, such that there is no temperature variation in the thermoelastic modules.

Variables affecting HR efficiency include but are not limited geometries and arrangements of the shape memory alloy structures within the thermoelastic modules, geometries and thermal properties of the fluid conduits connecting the thermoelastic modules during the HR process, flow rate of HTF during HR, and HR cycle duration. Such variables generally affect HR efficiency independently. Accordingly, non-dimensional numbers have been developed to provide optimal conditions for efficient thermal-wave HR.

Equation (1) is the non-dimensional HR duration, $t^*$, which is defined by the ratio between the HR duration, $t_{HR}$, and the time required by any particle in the HTF to travel the distance that is equal to the length of one thermoelastic module and the length of one fluid conduit, and is given by:

$$t^* = \frac{t_{HR}}{t_{travel}} = \frac{t_{HR}}{\frac{L_{702a}}{u_{404}} + \frac{L_{702b}}{u_{704}}}, \quad (1)$$

where $L_{702a}$ is the length 702a of the thermoelastic module 404, $L_{702b}$ is the length 702b of the fluid conduit 704, $u_{404}$ is the mean fluid velocity through the thermoelastic module 404, and $u_{704}$ is the mean fluid velocity through the fluid conduit 704. If t*=2, then during one HR cycle, a particle inside the flow travels one circuit to the same location where it started.

Equation (2) is the nondimensional length, l*, that characterizes the percentage a particle in the flow travels within one of the thermoelastic modules through the HR process, and is given by:

$$l^* = \frac{t_{TM}}{t_{travel}} = \frac{\frac{L_{702a}}{u_{404}}}{\frac{L_{702a}}{u_{404}} + \frac{L_{702b}}{u_{704}}}. \qquad (2)$$

When l*=1, this corresponds to a zero length for the fluid conduit, and when l*=0, this corresponds to a zero length for the thermoelastic modules.

For an ideal HR cycle, it has been determined that t*=1 and l*=0. However, there are two real factors contributing to deviation from 0 for l*. The first is the finite axial conduction caused by non-zero thermoelastic module length, since any non-zero thermoelastic module length with finite thermal conductivity results in non-uniform temperature distribution for the thermoelastic module along flow direction. The second is the additional time for HTF to flow within the thermoelastic module.

Figure 9:
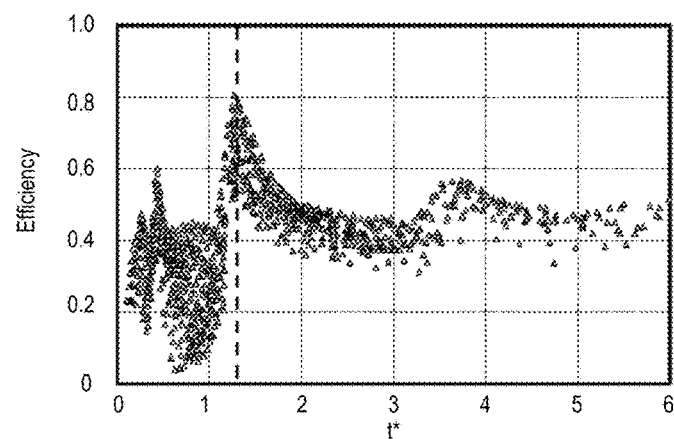
FIG. 9 is a graph illustrating heat recovery efficiency as a function of non-dimensional cycle time, $t^*$.

FIG. 9 shows simulation results for the effect on efficiency for variations of the geometries of the shape-memory alloy structures, geometries of the fluid conduits, duration of the HR cycle, and velocity of the HTF during HR cycle. In particular, the length, $L_{702a}$, of the shape-memory alloy structures was varied between 0.25 m and 0.75 m. The length, $L_{702b}$, of the fluid conduits was varied between 0.1 m and 0.8 m. The inner diameter of the fluid conduits was varied between 19 mm and 38 mm. The HR duration, $t_{HR}$, was varied between 12 s and 36 s. The mean flow velocity was varied between 0.05 m/s and 0.15 m/s, corresponding to variations in l* between 0.05 and 0.9.

As is readily apparent from FIG. 9, the optimum efficiency occurs when t* is around 1.25. FIG. 9 also indicates a minimum efficiency when t* is around 0.9. The physical interpretation of t*<1 is that the thermal-wave peak from the opposite thermoelastic module has not yet arrived at the reference thermoelastic module. The limit case is when t* approaches zero (when the thermal-wave propagation speed approaches zero, or solid bed/HR pipe length approaches infinity), such that the efficiency drop to zero. Beyond the peak efficiency point t*=1.25, the efficiency decreases since the additional thermal-wave has the counter effect. The limit case is when t*/infinity (or thermodynamic equilibrium state), such that the efficiency becomes 0.5.

One observation from FIG. 9 is that the HR efficiency is less dependent on t* when t* is less than 1, since it diverges at the same t* value. The previous discussion explains the physics for the case when t*<1, in particular that the thermal-wave peak has not yet arrived from the opposite thermoelastic module. As a result, the efficiency is sensitive to how far away is the peak, or in other words, the ratio of the solid bed traveling time l*. Thus, when t* <1, the HR efficiency is no longer sensitive to t*, but rather dependent on l*, and vice versa for cases where t*>1.

Figure 10:
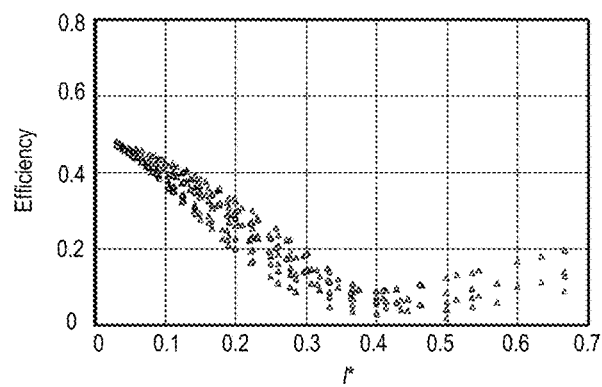
FIG. 10 is a graph of heat recovery efficiency as a function of non-dimensional length, $l^*$.

FIG. 10 illustrates HR efficiency for variations in l* when 0.8<t*<1. In particular, the length, $L_{702a}$, of the shape-memory alloy structures was varied between 0.25 m and 0.75 m. The length, $L_{702b}$, of the fluid conduits was varied between 0.1 m and 0.8 m. The inner diameter of the fluid conduits was varied between 19 mm and 38 mm. The mean flow velocity was varied between 0.1 m/s and 0.4 m/s.

As illustrated in FIG. 10, the minimum efficiency may be determined by l*, or the geometries of both thermoelastic modules and their connecting fluid conduits. To enhance HR performance, a small l* (e.g., less than 0.1) may be desirable. It should be noted that for the ideal case, there is no temperature gradient in the thermoelastic module and the HTF contained therein. However, when l*>0, as in real-world practical embodiments, the conduction loss caused by flow direction temperature gradients degrades the HR performance. In embodiments, the system can be designed such that l* is between 0.05 and 0.3, inclusive.

Figure 11:
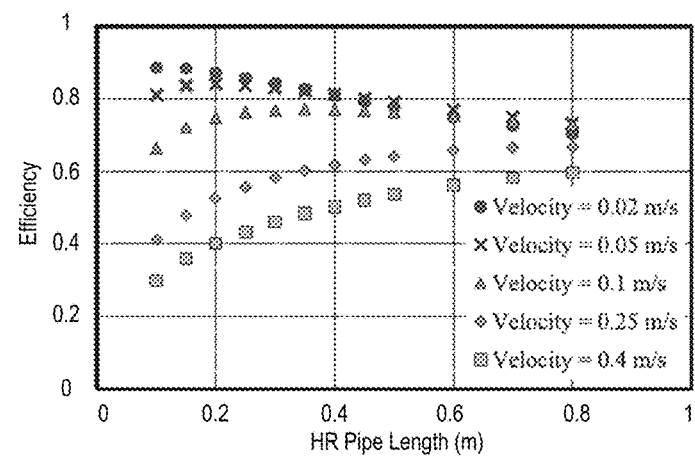
FIG. 11 is a graph of heat recovery efficiency as a function of velocity and length of a fluid conduit connecting a pair of thermoelastic cooling modules during heat recovery.

FIG. 11 illustrates the individual effects of fluid conduit length (i.e., 702b), fluid conduit internal diameter, and flow velocity. As is apparent from FIG. 11, an optimum fluid conduit length 702b exists, since a conduit that is too short would provide an insufficient temperature gradient for optimal thermal wave operation. Moreover, excessive amounts of pipe wall for a fluid conduit that is too long can lead to thermal mass damping that otherwise neutralizes the temperature gradient. FIG. 11 also indicates that velocity also affects HR performance, with lower flow rates improving HR efficiency. In embodiments, the system can be controlled such that a velocity of the HTF in the fluid conduit and/or with the structures of the thermoelastic modules is less than or equal to 0.1 m/s.

In general, for optimal thermal wave operation, any asymmetry in the HR cycle should be avoided. Thus, the HR conduits 704, 706 should be substantially identical in terms of material, length, inner and outer wall diameters, wall thickness, etc. Fluid conveyors (e.g., pumps) and fluid control elements (e.g., valves or switches) should also be selected to avoid unnecessary heat generation that may lead to imbalances in the HR cycle.

Figure 12:
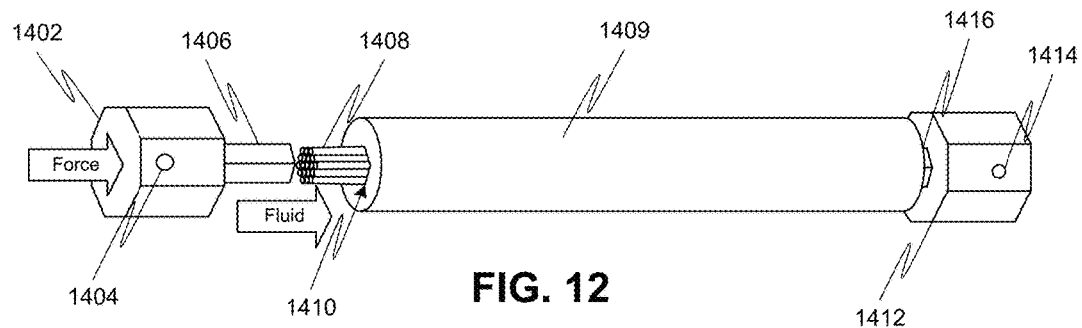
FIG. 12 is a partially exploded view of an exemplary embodiment of a thermoelastic cooling module subject to axial loading, according to one or more embodiments of the disclosed subject matter.

In one or more embodiments, each thermoelastic module can comprise the shape-memory alloy structures contained within an appropriate holding structure that provides loading of the structures as well as HTF delivery. An example of such a thermoelastic module is illustrated in FIG. 12. An array of tubes 1408 can be disposed within an internal recess 1410 of a holder 1409, which supports the tubes during axial application of a compressive force by loading heads 1402, 1412 to avoid buckling. For example, the array of tubes 1408 may be an array of 10 nitinol tubes, which require stress of about 1000 MPa (or about 6.7 kN force per tube) to produce the necessary thermoelastic conversion from austenite to martensite. HTF is delivered to the tubes 1408 via an inlet port 1404 of loading head 1402 and an appropriate extension 1406 to inlet ends of the tubes, such that the HTF can flow therethrough. HTF then exits the tubes 1408 at an opposite axial end to extension 1416 of the opposite loading head 1412 where it proceeds to outlet port 1414.

The holder 1409 can be designed to sustain stress from the tubes 1408 in a radial direction during the compression loading, as well as to avoid buckling of tubes 1408. The two loading heads 1402, 1412 can be designed to feed HTF into each of the tubes 1408 for heat transfer as well as to transfer compression forces directly to the tubes 1408. For example, the top hexagonal portion of each loading head 1402, 1412 can have multiple HTF flow channels corresponding to each of the tubes 1408 inside the holder 1409. The HTF flow channels can coalesce and connect to another orthogonal channel, which can be connected to external HTF pipes, e.g., via port 1404. For example, the holder 1409 and each loading head 1402, 1412 can be made of enhanced steel, although other materials are also possible according to one or more contemplated embodiments. In particular, the materials for the holder 1409 and loading heads 1402, 1412 can be chosen to minimize heat transfer between the tubes and the holder 1409 or the loading heads 1402, 1412 as well as between HTF and the holder 1409 or the loading heads 1402, 1412.

Figure 13:
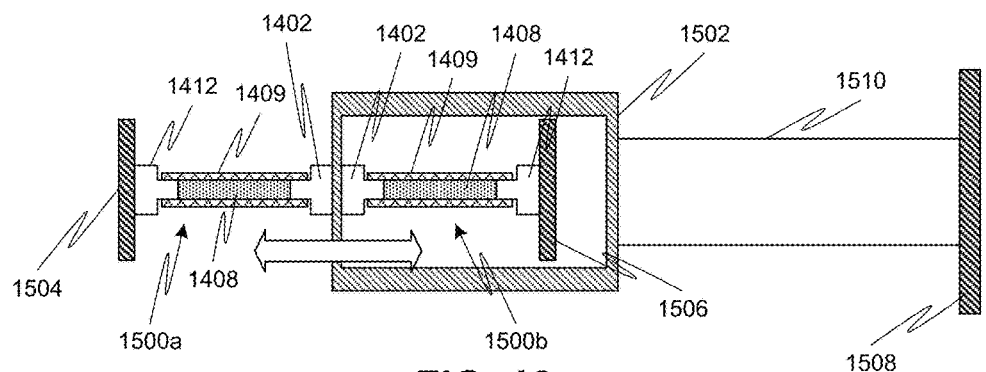
FIG. 13 illustrates a paired thermoelastic module design employing preloading of the modules to enable work recovery, according to one or more embodiments of the disclosed subject matter.

In embodiments, the thermoelastic modules can be mechanically coupled together to enable work recovery during loading/unloading. For example, FIG. 13 illustrates a pair of thermoelastic modules, similar to the thermoelastic module of FIG. 12, coupled together. Thermoelastic module 1500a can be fixed at one side by fixture 1504 while thermoelastic module 1500b can be fixed at an opposite end by fixture 1506. The thermoelastic modules 1500a,b may be positioned between the fixtures 1504, 1506 such that modules are preloaded, for example, at 50% of desired stress. The loading heads 1402 of the modules 1500a,b can be coupled together, such that loading of one module results in the unloading of the other module, whereby the force unloaded from one can be used in the loading of the other. The coupled loading heads 1402 of the modules 1500a,b can be connected to an arm or moving box 1502 connected to a linear actuator 1510. Box 1502 can capable of moving back and forth to alternately compress each thermoelastic module in turn. The linear actuator can be fixed to a support 1508 and constructed to move the box 1502 back and forth to effect the desired compression. The linear actuator can be driven by, for example, two stepping motors, although other driving mechanisms are also possible according to one or more embodiments.

To enable work recovery, both modules 1500a,b can be preloaded with 50% maximum strain. For example, when one module is loaded 100% and ready to be unloaded, the other module is fully unloaded. During the unloading process for one module, the remaining stress assists the moving box 1502 to compress the other module, similar to a loaded spring. In this way, the unloading energy can be recovered.

As shown in FIG. 12, the tubes 1408 can be arranged in an HCP layout within holder 1409. Axial conduction of temperature to the holder 1409 directly absorbs heat during the loading process and releases heat during the unloading process, which can neutralize part of the heating/cooling capacity during heat exchange between the tubes 1408 and HTF. Thus, in embodiments, a separate layer of low thermal conductivity insulation material (e.g., having a thermal conductivity less than about 1 W/m-K) can be arranged between the holder 1409 and the tubes 1408, or a thin film of low thermal conductivity insulating material can be applied to an inner wall of the holder 1409 or an outer portion of the array of tubes 1408.

Figure 14:
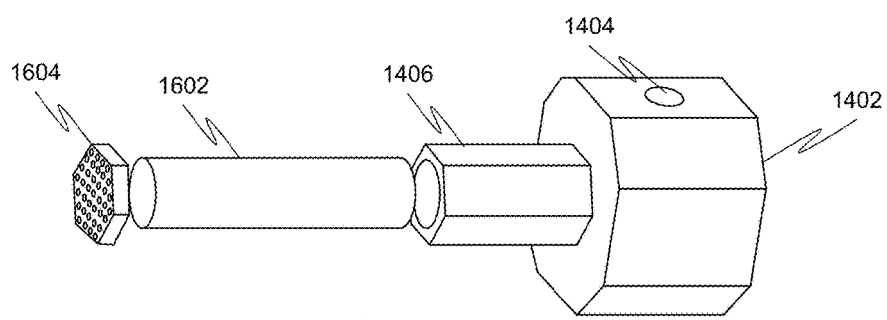
FIG. 14 is an exploded view of an exemplary embodiment of a loading head of a thermoelastic cooling module employing an insulation layer design, according to one or more embodiments of the disclosed subject matter.

Similar insulating techniques can be applied to the two loading heads 1402, 1414. For example, a thin film of low thermal conductivity insulating material can be applied to surfaces of the loading head or a separate layer of low thermal conductivity insulating material can be disposed between the loading head and the HTF flow path or the tubes 1408. For example, FIG. 14 shows an exemplary configuration of a loading head 1402 with an insulating tube 1602, such as a polytetrafluoroethylene (PTFE) tube or polyetheretherketone (PEEK) tubes, disposed within an inner volume of coupling portion 1406. HTF entering via inlet port 1404 flows through an interior volume of insulating tube 1602 and is then distributed to individual tubes 1408 via a meshed layer 1604, where openings in the meshed layer correspond to inlet ends of the tubes 1408. The meshed layer 1604 can also be formed of insulating material, or a thermally conductive material such as a metal.

Figure 15:
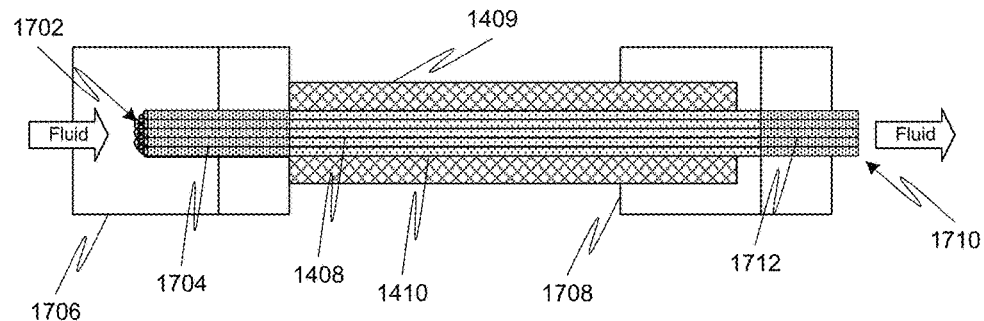
FIG. 15 is a cross-sectional view of another exemplary embodiment of a thermoelastic cooling module employing insulating tubes in a loading plate without a loading head, according to one or more embodiments of the disclosed subject matter.
Figure 16:
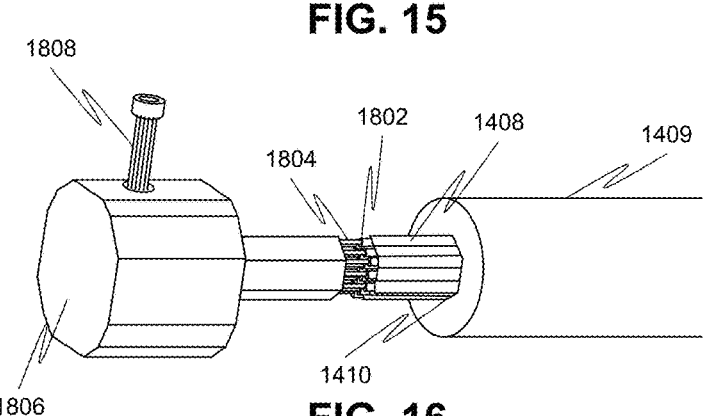
FIG. 16 is a partially exploded view of another exemplary embodiment of a thermoelastic cooling module employing insulating tubes sealed to the shape memory alloy structures, according to one or more embodiments of the disclosed subject matter.

Alternatively or additionally, smaller tubes 1704, formed of plastic or other low thermal conductivity insulating material, can be arranged as an array 1702 within a loading plate 1706, with each tube 1704 corresponding to one of the shape-memory alloy tubes 1408 within holder 1409 to deliver HTF thereto, as illustrated in FIG. 15. Other tubes 1712, also formed of plastic or other low thermal conductivity insulating material, can be arranged as an array 1710 at an opposite end within plate 1708 to receive HTF exiting the shape-memory alloy tubes 1408. The outer diameter of the tubes 1704, 1712 can be smaller than the inner diameter of any holes for HTF in the loading head or plate. Since the HTF only flows inside tubes 1704, 1712 and the loading head or plate 1706 is only for compression, these embodiments essentially decouple HTF delivery and loading. In addition, using smaller insulating tubes 1704, 1712 also reduce the dead thermal mass of the HTF itself. Alternative configurations for decoupling HTF delivery and loading are also possible according to one or more embodiments. For example, the HTF can be delivered through appropriate inlet ports in the holder 1409 rather than via the loading head or plate.

In the configuration illustrated in FIG. 15, loading plates 1706, 1708 rather than loading heads 1402 are used to compress the tubes 1408 directly. Holes in both loading plates 1706, 1708 allow tubes 1704, 1712 to be inserted therein. In contrast, the configuration illustrated in FIG. 16 has loading head 1806 with insulating tubes 1804 extending therethough. Such tubes 1804 may be a relatively less rigid thermoplastic material, such as but not limited to PEEK, so that the tubes can bend within the loading head 1806 to extend through to the inlet port at 1808. The outside of the loading head 1806 can be sealed by a distributor against the external HTF loop fitting, and rubber plugs 1802, or other insulating seals, can be used to seal the other side of tubes 1802 to an inlet end of the tubes 1408.

Figure 17:
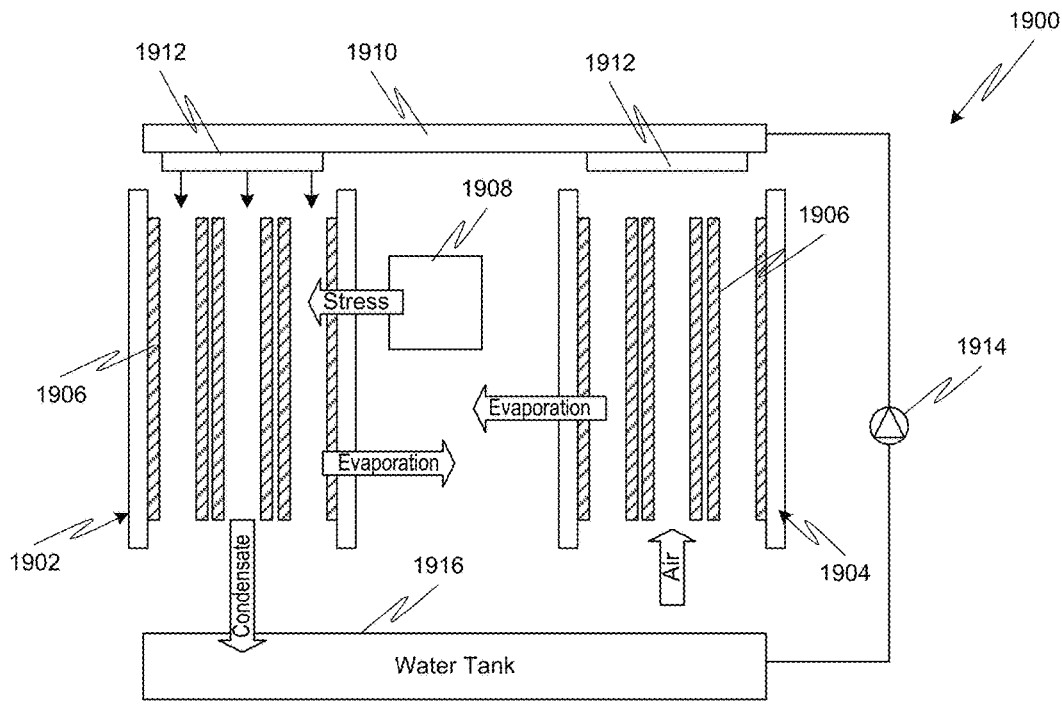
FIG. 17 is a generalized schematic diagram of an evaporative cooling system employing a pair of thermoelastic cooling modules, according to one or more embodiments of the disclosed subject matter.

Referring to FIG. 17, an evaporative cooling system 1900 employing thermoelastic techniques is illustrated. As with other embodiments, system 1900 includes at least a pair of thermoelastic modules 1902, 1904. For example, each thermoelastic module 1902, 1904 can contain an array of shape-memory alloy tubes 1906, although any of the thermoelastic structures illustrated in FIGS. 5A-5I or other thermoelastic structures can be employed in system 1900.

During a first phase of operation, the first thermoelastic module 1902 is stressed by loading device 1908, thereby releasing heat. At the same time, the second thermoelastic module 1904 can be unloaded, thereby absorbing heat. In a second phase, a pump 1914 can convey first HTF (e.g., water) from a tank 1916 to a fluid conduit 1910 connected to one or more nozzles or spraying devices 1912. The spraying device 1912 above the first thermoelastic module 1902 can spray first HTF onto tubes 1906. Evaporation of the first HTF causes cooling of the tubes 1906 of the first thermoelastic module 1902, and the condensate collects in tank 1916 for subsequent reuse.

As the first thermoelastic module 1902 turns to the HR phase, a second HTF (e.g., air) can be directed to flow through the tubes 1906, as shown with respect to the second thermoelastic module 1904 in FIG. 17. At this time, any residue of the first HTF (e.g., water) inside or outside of the tubes 1906 from the last phase will evaporate to the incoming second HTF and provides an extra amount of evaporative cooling to the second HTF. The process can be repeated with the first and second thermoelastic modules 1902, 1904 undergoing HR and subsequently switching roles, similar to other embodiments discussed above. Such a configuration can exploit not only the latent capacity of the shape-memory alloy structures but also that of the first HTF, thereby increasing the cooling capacity of the system.

Although embodiments have been described above with a pair of thermoelastic modules, embodiments of the disclosed subject matter are not limited thereto. Indeed, embodiments are contemplated where more than two thermoelastic modules are employed, for example, in a cascade arrangement as illustrated in FIG. 18. Similar to FIG. 3, the system can include a controller 312, first and second thermoelastic modules 304, 306 alternately stressed by a loading device 310, a reconfigurable fluid network 314, and a fluid conveyor 316. However, third and fourth thermoelastic modules 2002, 2008 are additionally provided, which may be stressed as appropriate by loading devices 2010, 2012. Although shown separately, it is of course contemplated that loading devices 310, 2010, and 2012 can be integrated in a single unit.

In the cascade design of FIG. 18, there are in essence two independent thermoelastic systems that operate at different temperature levels. However, the heat sink of the low temperature cycle also serves as the heat source of the high temperature cycle. In other words, in the low temperature cycle, the energy released from the compression of the shape-memory alloy structures of the thermoelastic module can be absorbed by the high temperature cycle shape-memory alloy structures during its recovery phase. Consequently, as the high temperature cycle shape-memory alloy structures are compressed, it reaches a higher temperature than the lower stage cycle does. As a result, the cascade design can create a higher temperature lift than would otherwise be available with a single stage design. Multiple-cascade stage designs (i.e., incorporating even more than the four thermoelastic modules of FIG. 18) are also possible and can achieve even larger temperature differentials.

As noted above with respect to FIG. 13, the loading and unloading of the shape-memory alloy structures of a pair of thermoelastic cooling modules can be coupled together such that loading of one is effective to unload the other. However, embodiments of the disclosed subject matter are not limited to the specific arrangement illustrated in FIG. 13. For example, FIGS. 19A-19B illustrate an embodiment of a system employing a crank design. A first thermoelastic module 2102 can be disposed between an upper end plate 2108a and piston 2106, while a second thermoelastic module 2104 can be disposed between a lower end plate 2108b and piston 2106. The piston 2106 is connected to a rotating drive wheel 2110 by arm 2112 so as to provide a reciprocating motion to the piston 2106. As previously discussed, the thermoelastic modules 2102, 2104 can be pre-compressed to 50% of desired strain prior to any compression by piston 2106. As the piston 2106 moves up and down, it will alternately load and unload the thermoelastic modules 2102, 2104 to provide the desired thermoelastic phase transition of the shape-memory alloy structures and corresponding heat generation or absorption. The shape material alloy structures in the first thermoelastic module 2102 and the second thermoelastic module 2104 can be any of the configurations disclosed in FIGS. 5A-5I, for example, or any other thermoelastic structure.

Although embodiments have been described above with respect to cyclic operation of at least two thermoelastic modules, embodiments of the disclosed subject matter are not limited thereto. Rather, in some applications, it may be desirable to use a single thermoelastic module to provide on-demand heating or cooling. After the single use, the thermoelastic module may be subject to regeneration for subsequent re-use in on-demand heating or cooling.

Figures 20, 21:
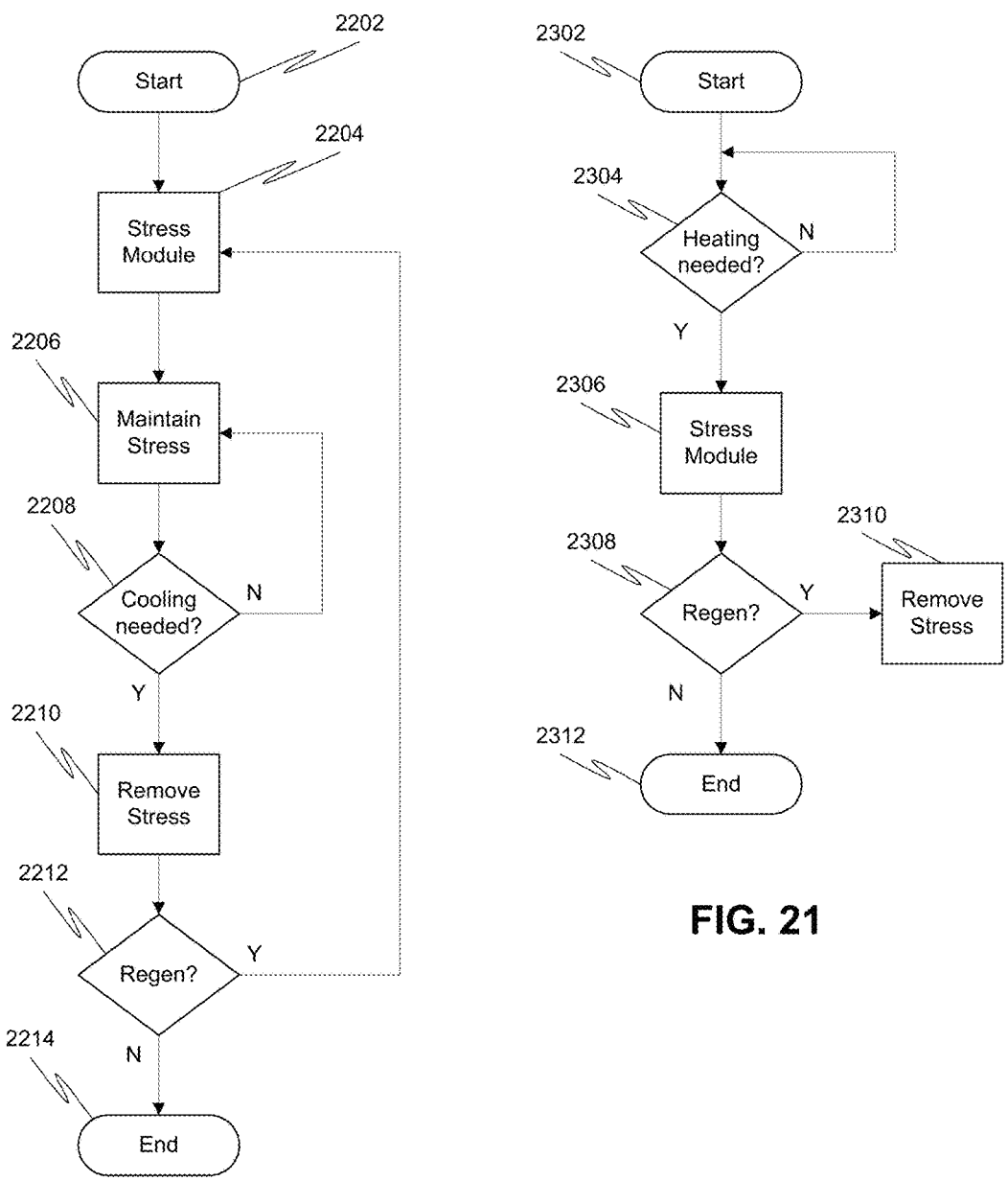
FIG. 20 is a simplified process flow for use of a single thermoelastic cooling module for on-demand cooling, according to one or more embodiments of the disclosed subject matter.
FIG. 21 is a simplified process flow for use of a single thermoelastic cooling module for on-demand heating, according to one or more embodiments of the disclosed subject matter.

FIG. 20 is an exemplary process flow diagram for the use of a thermoelastic module to provide on-demand cooling. The process may be begin at 2202 and proceed to 2204, where the thermoelastic module is subject to sufficient stress to cause the shape-memory alloy structures therein to convert from the first crystal phase (e.g., austenite) to the second crystal phase (e.g., martensite), thereby releasing latent heat. At 2206, the thermoelastic module may be maintained in the stressed state, although its temperature may be allowed to decrease, for example, by equilibrating with ambient or by active dumping to a heat sink in anticipation of delivery to an end user. The stress may be maintained on the thermoelastic module until ready for on-demand cooling, for example, by an appropriate removable clamping mechanism or the like.

When it is determined that cooling is needed at 2208, the stress on the thermoelastic module is released at 2210, for example, by removing the clamping mechanism, thereby allowing the shape-memory alloy to transition back to the first crystal phase and absorb latent heat. The absorption of latent heat causes a temperature drop that provides the desired cooling. Once the cooling capacity of the thermoelastic module has been expended (e.g., when the temperature thereof equilibrates with ambient), the module can be subject to regeneration by applying stress at 2204 or can be discarded at 2214.

For example, the process of FIG. 20 can be applied to the use of a thermoelastic module as a beverage cooler. The thermoelastic module can be configured with an inner diameter that matches the size of the beverage container, for example, a can or bottle, in order to aid in the heat exchange therebetween. The outer diameter of the thermoelastic module can be determined by the cooling capacity. Optionally, the outer surface of the thermoelastic module can be covered by a thermal insulation layer to prevent or at least reduce any loss of cooling power.

Prior to use, the thermoelastic module is pre-compressed (e.g., along an axial direction thereof) and clamped in place. The precompression stress can induce the thermoelastic material phase transition that releases all of the shape-memory alloy's latent heat. Once the latent heat is naturally dumped and the module has equilibrated with room temperature, the thermoelastic module can then be ready for use as a cooler.

When cooling of the beverage container is desired, it can be placed within the inner diameter of the thermoelastic module and the clamping released to unload the shape-memory alloy structures. As a result, the shape-memory alloy structure will transition back to the austenite crystal phase and absorb latent heat, thereby cooling the container. After cooling, the container can be removed from the thermoelastic module, and the module can be recycled and reused.

Similar operation of the thermoelastic module for on demand heating is also possible. For example, FIG. 21 is an exemplary process flow diagram for the use of a thermoelastic module to provide on-demand heating. The process may be begin at 2302 and proceed to 2304, where it is determined whether heating is needed. When heating is desired, at 2306 the thermoelastic module is subject to sufficient stress to cause the shape-memory alloy structures therein to convert from the first crystal phase (e.g., austenite) to the second crystal phase (e.g., martensite), thereby releasing latent heat. The release of latent heat causes a temperature increase that provides the desired heating. Once the heating capacity of the thermoelastic module has been expended (e.g., when the temperature thereof equilibrates with ambient), the module can be subject to regeneration at 2308 by removing stress at 2310 or can be discarded at 2312.

Other applications of the disclosed embodiments include, but are not limited to, energy storage, dehumidification, air-conditioning, refrigeration, beverage or bottle cooling (e.g., cup holder or vending machine), beverage or cup heating (e.g., cup holder), and personal comfort (e.g., heated seats, cooling or heating of extremities), as well as conventional applications where VCC technologies are employed. Indeed, various applications for heating and cooling, whether cyclic or single use, will be readily apparent to one of ordinary skill in the art, and such applications are within the scope of the present disclosure.

It will be appreciated that the control system or method described herein can be implemented in hardware, hardware programmed by software, software instruction stored on a non-transitory computer readable medium or a combination of the above. For example, the disclosed control system or method can be implemented, for example, using a processor configured to execute a sequence of programmed instructions stored on a non-transitory computer readable medium. For example, the processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, LabVIEW, or another structured or object-oriented programming language. The sequence of programmed instructions and data associated therewith can be stored in a non-transitory computer-readable medium such as a computer memory or storage device which may be any suitable memory apparatus, such as, but not limited to read-only memory (ROM), programmable read-only memory (PROM), electrically erasable programmable read-only memory (EEPROM), random-access memory (RAM), flash memory, disk drive and the like.

Furthermore, the control system or method can be implemented as a single processor or as a distributed processor. Further, it should be appreciated that the steps mentioned herein may be performed on a single or distributed processor (single and/or multi-core). Also, the processes, methods, routines, and sub-routines described in the various figures of and for embodiments herein may be distributed across multiple computers or systems or may be co-located in a single processor or system. Exemplary structural embodiment alternatives suitable for implementing the control system or method described herein are provided below.

The control system or method described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example.

Embodiments of the control method or system (or their sub-components), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, or the like. In general, any process capable of implementing the functions or steps described herein can be used to implement embodiments of the methods, systems, or computer program products (e.g., software program stored on a non-transitory computer readable medium).

Furthermore, embodiments of the control system or method may be readily implemented, fully or partially, in software using, for example, object or object-oriented software development environments that provide portable source code that can be used on a variety of computer platforms. Alternatively, embodiments of the control system or method can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the control system or method can be implemented in hardware and/or software using any known or later developed systems or structures, devices and/or software by those of ordinary skill in the applicable art from the functional description provided herein and with a general basic knowledge of control systems, heating/cooling systems, and/or computer programming arts.

In this application, unless specifically stated otherwise, the use of the singular includes the plural and the use of "or" includes "and/or." Furthermore, use of the terms "including" or "having," as well as other forms, such as "includes," "included," "has," or "had" is not limiting. Any range described herein will be understood to include the endpoints and all values between the endpoints. Whenever "substantially", "approximately", "near", "about" or similar language is used herein in combination with a specific value, variations up to and including 10% of that value are intended, unless explicitly stated otherwise.

Furthermore, the foregoing descriptions apply, in some cases, to examples generated in a laboratory, but these examples can be extended to production techniques. For example, where quantities and techniques apply to the laboratory examples, they should not be understood as limiting. In addition, although specific materials have been disclosed herein, other materials may also be employed according to one or more contemplated embodiments.

Features of the disclosed embodiments may be combined, rearranged, omitted, etc., within the scope of the invention to produce additional embodiments. Furthermore, certain features may sometimes be used to advantage without a corresponding use of other features.

It is thus apparent that there is provided in accordance with the present disclosure, system, methods, and devices for solid-state heating or cooling. Many alternatives, modifications, and variations are enabled by the present disclosure. While specific embodiments have been shown and described in detail to illustrate the application of the principles of the present invention, it will be understood that the invention may be embodied otherwise without departing from such principles. Accordingly, Applicant intends to embrace all such alternatives, modifications, equivalents, and variations that are within the spirit and scope of the present invention.

The invention claimed is:

1. A heating/cooling system comprising:
   a plurality of modules, each of the modules comprising one or more structures formed of shape memory alloy, the shape memory alloy being constructed to convert from a first crystal phase to a second crystal phase upon application of a first stress and to release latent heat in converting from the first crystal phase to the second crystal phase;
   at least one loading device coupled to the modules and configured to apply a force thereto;
   a fluid network coupled to a heat source and a heat sink;
   at least one pump configured to move heat transfer fluid through the fluid network; and
   a controller operatively coupled to the fluid network, the at least one loading device, and the at least one pump and configured to control the heating/cooling system such that:
      during a first part of a cycle, a first of the plurality of modules rejects heat to the heat sink while a second of the plurality of modules absorbs heat from the heat source, and
      during a second part of the cycle, the first and second modules are connected together to transfer heat therebetween.

2. The heating/cooling system of claim 1, wherein the controller is further configured to control the heating/cooling system during the second part of the cycle to generate a thermal wave temperature profile in a portion of the fluid network connecting the first and second modules together such that a temperature difference between each module and the heat transfer fluid entering the respective module is minimized throughout said second part of the cycle.

3. The heating/cooling system of claim 2, wherein the controller is configured to control the heating/cooling system during the second part of the cycle such that a non-dimensional heat recovery duration, $t^*$, is greater than 1, and $t^*$ is given by a ratio of a duration of the second part of the cycle ($t_{HR}$) to a time for any particle in the fluid network to travel a distance equal to a length of either of the first or second modules and a conduit of the fluid network connecting the first and second modules together ($t_{travel}$).

4. The heating/cooling system of claim 3, wherein the controller is configured to control the heating/cooling system such that the non-dimensional heat recovery duration, $t^*$, is approximately 1.25.

5. The heating/cooling system of claim 2, wherein the controller is configured to control the heating/cooling system during the second part of the cycle such that a non-dimensional length, $l^*$, is less than 1, and $l^*$ is given by a ratio of time for any particle in the fluid network to travel through either the first or second modules to a time for the particle to travel a distance equal to a length of either of the first or second modules and a conduit of the fluid network connecting the first and second modules together ($t_{travel}$).

6. The heating/cooling system of claim 5, wherein the controller is configured to control the heating/cooling system such that the non-dimensional length, $l^*$, is between 0.05 and 0.3.

7. The heating/cooling system of claim 2, wherein the controller is configured to control the heating/cooling system during the second part of the cycle such that a velocity for the heat transfer fluid in the fluid network is less than 0.1 m/s.

8. The heating/cooling system of claim 2, wherein the portion of the fluid network connecting the first and second modules together comprises a first conduit connecting an outlet of the first module to an inlet of the second module and a second conduit connecting an inlet of the first module to an outlet of the second module, and the first and second conduits have about the same length, diameter, and wall thickness and are formed of the same material.

9. The heating/cooling system of claim 1, wherein the loading device and the first and second modules are constructed such that force unloaded from one of the first and second modules is recovered by the loading device in applying force to the other of the first and second modules.

10. The heating/cooling system of claim 1, wherein each module comprises a holder supporting the one or more structures of shape memory alloy therein and an insulating material disposed between the one or more structures and an interior wall of the holder.

11. The heating/cooling system of claim 10, wherein the insulating material is separate from the holder or applied as a film to the interior wall of the holder.

12. The heating/cooling system of claim 1, wherein the at least one loading device comprises a loading head for each module, each loading head disposed at an end of the respective holder and configured to deliver the force to the one or more structures within the holder, each loading head further comprising one or more conduits connecting the one or more structures to the fluid network.

13. The heating/cooling system of claim 12, wherein insulating material is disposed between inner walls of the one or more conduits and fluid flowing to the one or more structures.

14. The heating/cooling system of claim 13, wherein the insulating material comprises tubes inserted into said conduits and/or a film applied to inner walls of the conduits.

15. The heating/cooling system of claim 1, wherein the at least one loading device comprises a loading head for each module, each loading head disposed at an end of the respective holder and configured to deliver the force to the one or more structures within the holder, the respective holder including inlet and outlet ports along one or more sidewalls thereof, the ports connecting the one or more structures to the fluid network.

16. The heating/cooling system of claim 1, wherein the one or more structures comprises a plurality of tubes, each tube having an interior volume through which the heat transfer fluid can flow.

17. The heating/cooling system of claim 16, wherein:
   each of the plurality of tubes has at least one additional tube disposed in the interior volume thereof, each additional tube being formed of the shape memory alloy and having a respective interior volume sealed such that heat transfer fluid does not flow therethrough; or
   each of the plurality of tubes has at least one solid rod disposed in the interior volume thereof, each solid rod being formed of the shape memory alloy.

18. The heating/cooling system of claim 1, wherein the one or more structures comprises a lattice of hollow tubes, each hollow tube having an interior volume through which the heat transfer fluid can flow, the lattice having spaces between the hollow tubes such that a second fluid can flow through the lattice without passing through said interior volumes.

19. The heating/cooling system of claim 1, wherein each of the first and second modules has been pre-stressed prior to application of any force by the at least one loading device.

20. The heating/cooling system of claim 1, wherein the plurality of modules comprises more than two modules connected together in a cascade arrangement.

* * * * *